United States Patent
Yasutake et al.

(10) Patent No.: US 8,234,043 B2
(45) Date of Patent: Jul. 31, 2012

(54) MOTION CONTROL DEVICE OF VEHICLE

(75) Inventors: Toshio Yasutake, Toyoake (JP); Fuminori Kato, Aki-gun (JP); Jouji Nishioka, Aki-gun (JP); Lodewijk Wijffels, Aachen (DE); Oliver Nehls, Aachen (DE)

(73) Assignee: Advics Co., Ltd., Kariya-Shi, Aichi (JP)

( * ) Notice: Subject to any disclaimer, the term of this patent is extended or adjusted under 35 U.S.C. 154(b) by 201 days.

(21) Appl. No.: 12/705,858

(22) Filed: Feb. 15, 2010

(65) Prior Publication Data

US 2010/0211269 A1 Aug. 19, 2010

(30) Foreign Application Priority Data

Feb. 13, 2009 (JP) ................................. 2009-031293

(51) Int. Cl.
*A01B 69/00* (2006.01)
*B62D 6/00* (2006.01)
(52) U.S. Cl. ........................................................ 701/42
(58) Field of Classification Search ...................... 701/42
See application file for complete search history.

(56) References Cited

U.S. PATENT DOCUMENTS

2005/0216161 A1* 9/2005 Sakugawa ........................ 701/70
2008/0114511 A1* 5/2008 Sakugawa et al. .............. 701/41

FOREIGN PATENT DOCUMENTS

JP  3-227762 A  10/1991

* cited by examiner

*Primary Examiner* — Mary Cheung
*Assistant Examiner* — Michael D Lang
(74) *Attorney, Agent, or Firm* — Buchanan Ingersoll & Rooney PC

(57) ABSTRACT

A motion control device of a vehicle comprises: a steering angle controller which controls a steering angle of a steering wheel so that an actual turning control variable becomes a target turning control variable; and a braking force controller which controls a vehicle braking force so that the actual turning control variable becomes the target turning control variable. The braking force controller selectively uses, as a steering angle signal for control, a first steering angle signal which reflects a steering angle compensation quantity compensated by the steering angle controller at the time of the oversteering of the vehicle is reflected, and a second steering angle signal which does not reflect the steering angle compensation quantity.

6 Claims, 21 Drawing Sheets

MOTION CONTROL DEVICE OF VEHICLE

BACKGROUND

The present invention relates to a motion control device of vehicles, such as an automobile, and particularly, to a motion control device which controls the motion of a vehicle at the time of turning manipulation.

Conventionally, a motion control device including a braking force control device which controls a vehicle braking force so that an actual turning control variable becomes a target turning control variable is widely known as a kind of motion control device which controls the motion of a vehicle at the time of turning manipulation. In this braking force control device for vehicle stabilization control, at the time of turning manipulation of a vehicle, braking forces applied to right and left steered wheels are individually controlled so as to minimize, for example, the deviation of an actual yaw rate based on an actual steering state of the steered wheels from a target yaw rate based on the steering angle and steering speed of the steered wheels by a driver. For example, for vehicle stabilization control, a system referred to as a so-called dynamic stability control (hereinafter refer to as "DSC") system which is adapted to perform the automatic control of a wheel braking force or the automatic control of engine output in addition to this is also a kind of such a braking force control system.

Additionally, in recent years, in addition to this braking force control, a steering angle control device which controls the steering angle of the steered wheels so that an actual turning control variable becomes a target turning control variable with respect to the steering angle control of the steered wheels is also put to practical use. In such a steering angle control device, the steering angle of the steered wheels is controlled so as to minimize, for example, the deviation of the actual yaw rate from the target yaw rate at the time of turning manipulation of a vehicle, and thereby, the steering of a driver is assisted. For example, a so-called steering stability control (hereinafter refer to as "SSC") system is also a kind of steering angle control system.

Furthermore, a steering angle control device, including a steering assist control function at the time of split μ which performs the steering assist control of eliminating the unstable behavior of the vehicle caused by this split μ in a case where so-called split μ that a difference above a predetermined value exists in the value of a road surface friction coefficient (road surface μ) has occurred in the right and left wheels during vehicle traveling, is known as the steering angle control device.

In this steering assist control at the time of split μ, or the SSC control, in a case where unstable behavior has occurred in the vehicle, in order to eliminate this unstable behavior, there is, for example, a case where so-called counter steering compensation, which turns tires in an opposite direction instantly, etc., is performed.

It is usual to minimize any deviation, which cannot be eliminated only by automatic control of a steering angle, first, by automatically controlling the steering angle of steered wheels so that an actual turning control variable becomes a target turning control variable by the steering angle control in a case where the motion control of a vehicle at the time of turning manipulation is performed by combining the above-described steering angle control with the aforementioned braking force control, and by using the braking force control system concurrently and automatically controlling the braking force to each wheel in a case where the deviation (for example, yaw rate deviation) of the actual turning control variable from the target turning control variable exceeds the operation limit of the steering angle control system (for example, refer to JP-A-3-227762).

Meanwhile, as one of concrete control mechanisms for suitably assisting a driver in the steering wheel manipulation by the driver, a so-called variable gear ratio (hereinafter refer to as "VGR") mechanism which enables a gear ratio corresponding to the steering angle (tire angle) of the steered wheels to a steering wheel steering angle to be changed is conventionally widely known. By including the VGR mechanism, the ratio of the steering angle of the steered wheels to the steering wheel steering angle can be made variable according to a vehicle speed, and the degree of a change in the steering angle of the steered wheels in a case where the steering wheel manipulation by the driver has occurred can be adjusted. For example, the small turn performance of a vehicle when entering a garage, etc. can be enhanced by turning the vehicle relatively greatly with a small amount of steering wheel manipulation at the time of ultra-low speed as when the vehicle enters a garage, while safety at the time of high-speed traveling can be improved by making a change in the tire angle small so that the traveling direction of the vehicle does not change over-sensitively with a slight amount of steering wheel manipulation.

Additionally, as another concrete control mechanism for suitably assisting a driver in steering wheel manipulation by the drive; in a case where there is steering wheel manipulation by the driver, a so-called compliance compensation (hereinafter refer to as "CmpC") mechanism which advances the phase of a tire angle according to a steering speed (angle) is well-known. By including this CmpC mechanism, the tire can be turned instantly quickly according to the steering speed at the time of steering wheel manipulation, and the responsiveness of vehicle behavior to the steering wheel manipulation of the driver can be enhanced.

By using the CmpC mechanism and the VGR mechanism together, the steering wheel manipulation of the driver can be more effectively assisted.

FIG. 22 is a schematic diagram showing a driver steering angle (refer to a solid line curve L1) when steering wheel manipulation by the driver has occurred, and the request tire angle of the VGR mechanism (a VGR request tire angle: refer to a broken line curve L2) in a superimposed manner on a time axis. The VGR request tire angle is expressed by a waveform obtained by multiplying a driver steering angle by a gain (gear ratio) according to a vehicle speed. The VGR mechanism makes this gain variable according to a vehicle speed.

Generally, this VGR request tire angle is highly correspondent to a driver steering angle, but it is lowly correspondent to the behavior of the vehicle which has responded to a steering wheel manipulation. In addition, in this FIG. 22 and FIGS. 23 to 25 (which will be described later), all of the respective tire angles are shown in terms of a pinion angle.

Additionally, FIG. 23 is a schematic diagram showing a [VGR+CmpC] request tire angle (refer to one-dot chain line curve L3) obtained by further superimposing the request tire angle (CmpC request tire angle) of the CmpC mechanism on the VGR request tire angle (refer to the broken line curve L2) shown in FIG. 22 when the phase of the VGR request tire angle is advanced by the CmpC mechanism. The CmpC request tire angle is expressed by a waveform (which is shifted to the left by a predetermined amount in FIG. 23) whose phase has been advanced according to a steering speed at the time of steering wheel manipulation with respect to the VGR request tire angle.

Generally, this [VGR+CmpC] request tire angle is highly correspondent to a driver steering angle, and it is also highly correspondent to the behavior of the vehicle which has responded to a steering wheel manipulation.

Moreover, FIG. 24 is a schematic diagram showing a [VGR+CmpC+SSC] request tire angle (refer to a broken line curve L4) serving as a final request tire angle obtained by superimposing a request tire angle (SSC request tire angle) based on the steering angle control by the aforementioned SSC system, on the [VGR+CmpC] request tire angle shown in FIG. 23. As mentioned above, in a case where unstable behavior has occurred in the vehicle in the steering assist control at the time of split μ and the SCC control, so-called counter steering compensation is performed as steering assist control of eliminating this unstable behavior. For this reason, as shown by a region M of the broken line curve L4 of FIG. 24, discontinuity appears in a change in the [VGR+CmpC+SSC] request tire angle.

Accordingly, this [VGR+CmpC+SSC] request tire angle is highly correspondent to the behavior of the vehicle which has responded to a steering wheel manipulation, but it is lowly correspondent to a driver steering angle As described above, in the motion control device which performs the motion control of a vehicle at the time of turning manipulation by combining the steering angle control and the braking force control, in a case where so-called oversteering has occurred at the time of turning manipulation, in order to eliminate or suppress the oversteering, the motion control device assists the steering of the driver by only the steering angle control by the steering angle controller when the behavior of the vehicle falls within a range from a normal region to a region where the compensation amount of the yaw moment is relatively small. When the yaw rate deviation becomes large with the progress of the oversteering, and the behavior of the vehicle falls within a limit region which exceeds the operation limit of the steering angle control system, the braking force control by the braking force controller is started. However, when the braking force control is started, a steering angle signal of the steering angle controller which has been continuing control until then is used.

However, there is a plurality of kinds of steering angle signals as described above (refer to FIGS. 22 to 24), and it is very important whether a certain steering angle signal is used in order to realize suitable braking force control and achieve rapid stabilization of vehicle behavior.

SUMMARY

Thus, the object of the invention is to provide a motion control device of a vehicle capable of performing a braking force control based on an actual tire turning angle in which a steering angle control is reflected in a vehicle state where oversteering does not occur by preferably selecting the steering angle signal used for the braking force control, while suppressing deterioration of the controllability of the braking force control resulting from appearance of discontinuity of a change in the tire turning angle at the time of occurrence of oversteering, or properly using a steering angle signal used for a braking force control used according to vehicle states, thereby ensuring the controllability of the braking force control according to circumstances, in a motion control device which performs the motion control of a vehicle at the time of turning manipulation by combining the steering angle control and a braking force control.

To achieve the object, a first aspect of the present invention is a motion control device of a vehicle comprising:

a steering angle controller which controls a steering angle of a steering wheel so that an actual turning control variable becomes a target turning control variable; and a braking force controller which controls a vehicle braking force so that the actual turning control variable becomes the target turning control variable, wherein a steering angle compensation quantity compensated by the steering angle controller at the time of oversteering of the vehicle is not reflected in a steering angle signal used for the control of the vehicle braking force by the braking force controller.

A second aspect of the present invention provides the motion control device, wherein the steering angle controller is configured so that a steering ratio is set according to a vehicle speed, the steering angle is compensated on the basis of a steering speed, and at the time of oversteering of the vehicle, the steering angle is compensated on the basis of the steering angle compensation quantity at the time of oversteering, and the braking force controller is configured so that a steering angle signal used for control at the time of the oversteering of the vehicle is set on the basis of the steering ratio and the steering speed.

A third aspect of the invention provides a motion control device of a vehicle comprising:

a steering angle controller which controls a steering angle of a steering wheel so that an actual turning control variable becomes a target turning control variable; and a braking force controller which controls a vehicle braking force so that the actual turning control variable becomes the target turning control variable, wherein the braking force controller selectively uses, as a steering angle signal for control, a first steering angle signal which reflects a steering angle compensation quantity compensated by the steering angle controller at the time of the oversteering of the vehicle is reflected, and a second steering angle signal which does not reflect the steering angle compensation quantity.

A fourth aspect of the present invention provides the motion control device, wherein the steering angle controller is configured so that a steering ratio is set according to a vehicle speed, a steering angle is compensated on the basis of a steering speed, and at the time of oversteering of the vehicle, the steering angle is compensated on the basis of the steering angle compensation quantity, the first steering angle signal is set on the basis of the steering ratio, the steering speed and the steering angle compensation quantity, and the second steering angle signal is set on the basis of the steering ratio and the steering speed and does not reflect the steering compensation quantity.

Furthermore, a fifth aspect of the present invention provides the motion control device, wherein when right and left steered wheels of the vehicle are respectively traveling on road surfaces which have road surface friction coefficients which are different from each other, the braking force controller uses the first steering angle signal for the control.

According to the first aspect of the present invention, a steering angle compensation quantity at the time of oversteering compensated by a steering angle controller for controlling the steering angle of a steered wheel so that an actual turning control variable becomes a target turning control variable, at the time of oversteering of a vehicle, is configured so as not to be reflected in a steering angle signal used for the control of a vehicle braking force by a braking force controller so that the actual turning control variable becomes the target turning control variable. Thereby, a braking force control is performed on the basis of an actual tire turning angle in which the steering angle control by the steering angle controller is reflected in a vehicle state where oversteering does not occur, while deterioration of the controllability of the braking force control resulting from discontinuity of a change in the tire taming angle in a case where oversteering has occurred at the time of vehicle turning can be suppressed.

According to the second aspect of the present invention, the same operational effects as the first invention can be basically exhibited. Additionally, the braking force controller is configured so as to use, specifically, a steering angle signal set on the basis of the steering ratio according to the vehicle speed, and the steering speed, except for only the steering angle compensation quantity at the time of oversteering compensated by the steering angle controller at the time of the oversteering of the vehicle, as a steering angle signal used for control at the time of the oversteering of the vehicle. Thereby, the deterioration of the controllability of a braking force control resulting from appearance of discontinuity in a change in the tire turning angle can be effectively suppressed while performing the braking control which has reflected an actual tire turning angle based on the steering wheel steering of the driver as much as possible, at the time of the oversteering of the vehicle.

According to the third aspect of the present invention, a braking force controller for controlling a vehicle braking force so that an actual turning control variable becomes a target turning control variable is configured so as to use properly a steering angle signal in which a steering angle compensation quantity at the time of oversteering compensated by a steering angle controller for controlling the steering angle of a steered wheel so that the actual turning control variable becomes the target turning control variable, at the time of the oversteering of a vehicle, is reflected, and a steering angle signal in which the steering angle compensation quantity at the time of oversteering is not reflected, as a steering angle signal used for control. Thereby, the controllability of the braking force control according to circumstances Can be ensured.

According to the fourth aspect of the present invention, the same operational effects as the third invention can be basically exhibited. Especially, the braking force controller is configured so as to use properly, specifically, a steering angle signal set on the basis of the steering ratio according to the vehicle speed, and the steering speed, and a steering angle signal having the steering angle compensation quantity at the time of oversteering reflected therein, as a steering angle signal used for control at the time of the oversteering of the vehicle. Thereby, the deterioration of the controllability of a braking force control resulting from appearance of discontinuity in a change in the tire turning angle can be effectively suppressed while performing the braking control which has reflected an actual tire turning angle based on the steering wheel steering of the driver as much as possible, at the time of the oversteering of the vehicle.

According to the fifth aspect of the present invention, the same operational effects as the fourth invention can be basically exhibited. Especially in a case where right and left steered wheels are traveling on road surfaces (so-called split μ road surface) which have road surface friction coefficients which are different from each other, the controllability of the braking force control at the time of the traveling on the split μ road surface can be effectively ensured by using the steering angle signal in which the steering angle compensation quantity at the time of oversteering is reflected, for the control of the braking force controller.

DESCRIPTION OF EXEMPLARY EMBODIMENTS

Hereinafter, exemplary embodiments of the invention will be described in detail with reference to the accompanying drawings.

In the following description, as long as there is no particular description, the forward direction of a vehicle shall be defined as the "front", and the "left" and the "right" shall coincide with the left and the right with respect to the forward direction of the vehicle.

Figure 1:
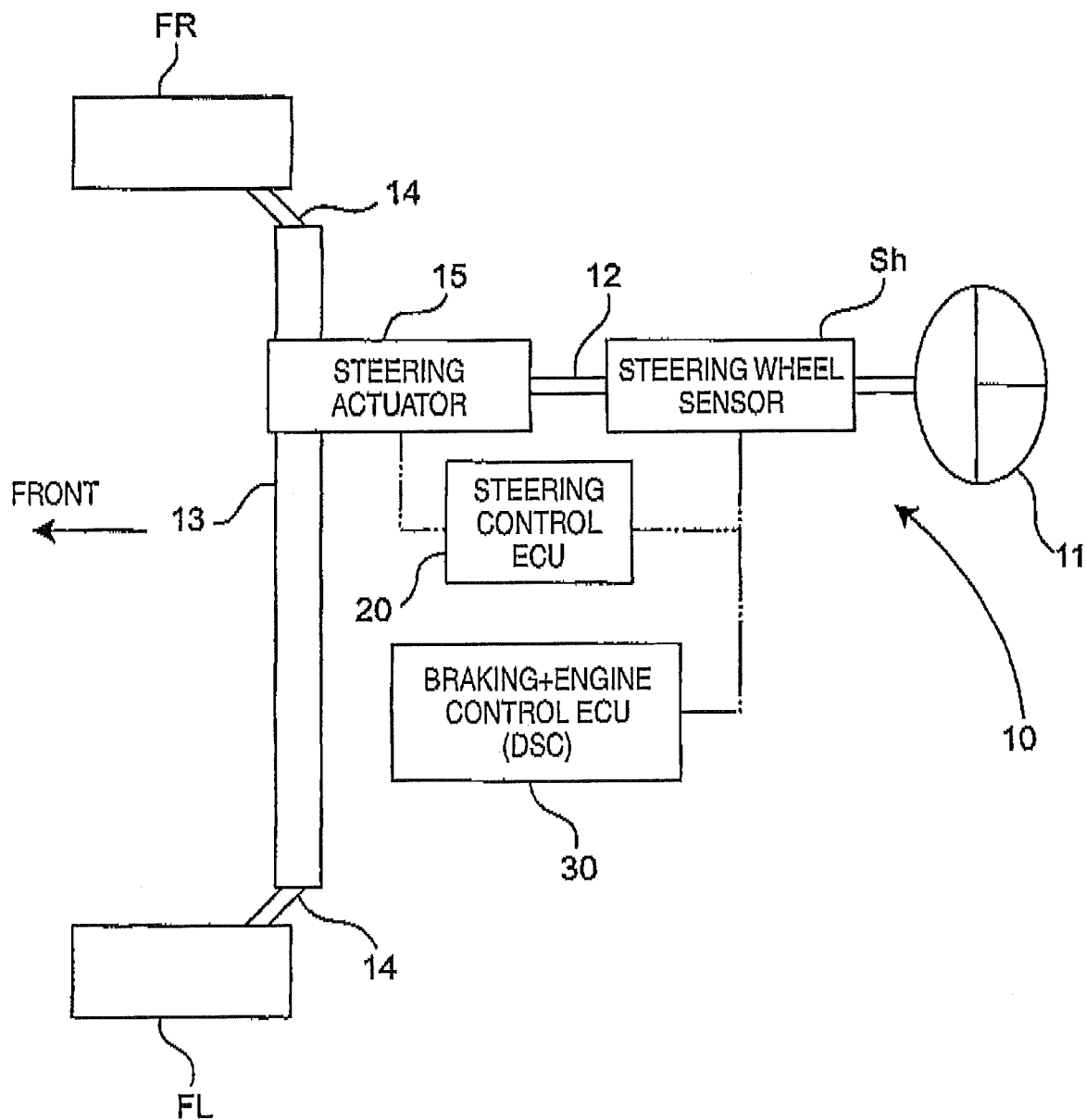
FIG. 1 is a block configuration diagram showing the outline of a front wheel steering apparatus of an automobile including a motion control device according to an embodiment of the invention.
Figure 2:
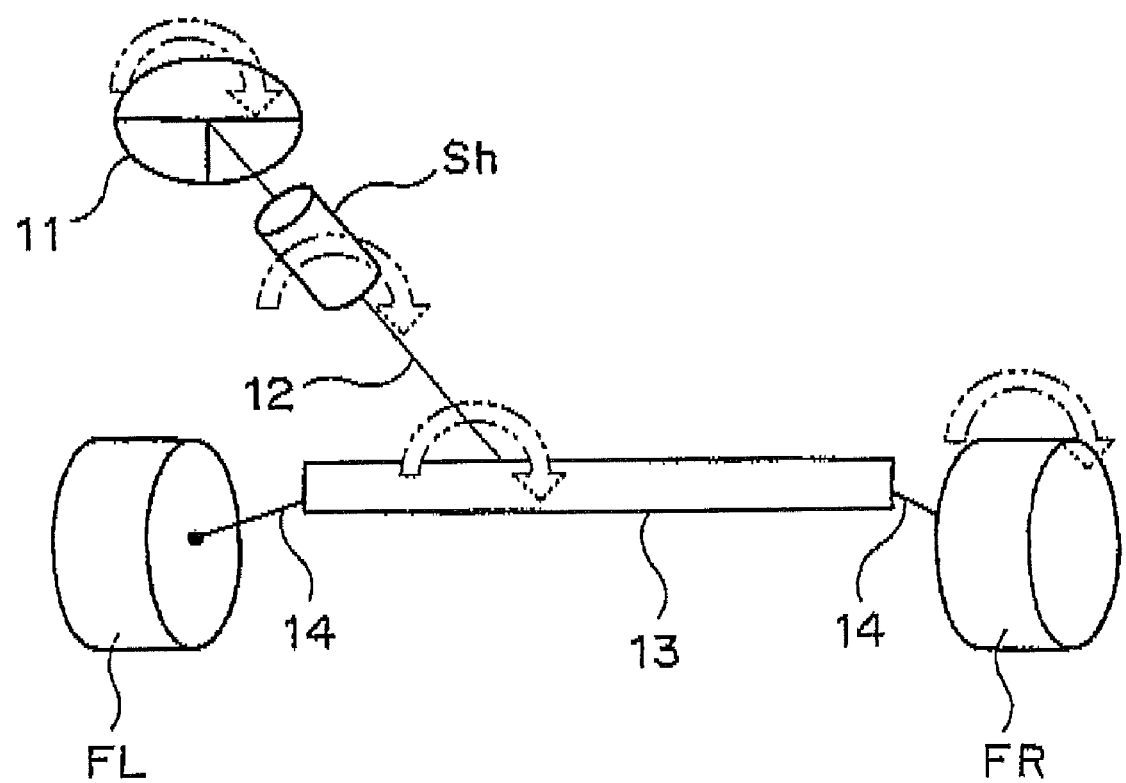
FIG. 2 is a perspective view schematically showing the schematic configuration of the front wheel steering apparatus.

FIG. 1 is a block configuration diagram showing an outline of a front wheel steering apparatus for steering front wheels as steered wheels (also referred to turning wheels) of an automobile including a motion control device according to the exemplary embodiment of the invention, and FIG. 2 is a perspective view schematically showing the schematic configuration of the front wheel steering apparatus.

As shown in these drawings, the front wheel steering apparatus 10 includes a steering wheel 11 which is rotationally manipulated by a driver, a steering shaft 12 which has the steering wheel 11 fixed to and supported on a rear end (right end in FIG. 1) thereof, and a steering actuator 15 which is coupled with a front part of the steering shaft 12.

The front wheel steering apparatus 10 is provided with a tie rod 13 which is movable in the right and left direction of the vehicle by the operation of the steering actuator 15, and a link mechanism unit 14 including a link which turns front right and left wheels FL and FR by the movement of the tie rod 13. Moreover, the front wheel steering apparatus 10 includes a steering wheel sensor Sh which is able to detect the steering angle of the steering wheel 11, and detect the steering speed (steering angle speed) of the steering wheel. All of these respective components are the same as conventionally well-known components.

The steering actuator 15 and the steering wheel sensor Sh are connected to a steering control ECU (Electronic Control Unit) 20 (which will be described later) so that signals can be transmitted and received. The steering control ECU 20 controls the steering actuator 15 in order to adjust the steering angle (Road Wheel Angle: hereinafter refer to as "RWA": also referred to as a "turtling angle" or "tire angle") of the front wheels FR and FL to an angle according to the steering angle (Steering Wheel Angle: hereinafter refer to as "SWA") of the steering wheel 11.

A detection signal of the steering wheel sensor Sh is input to a braking and engine control ECU 30 (which will be described later). Both, the steering control ECU 20, and the braking and engine control ECU 30 are configured as an electronic control unit including CPU, ROM, RAM (all of which are not shown), etc.

Figure 3:
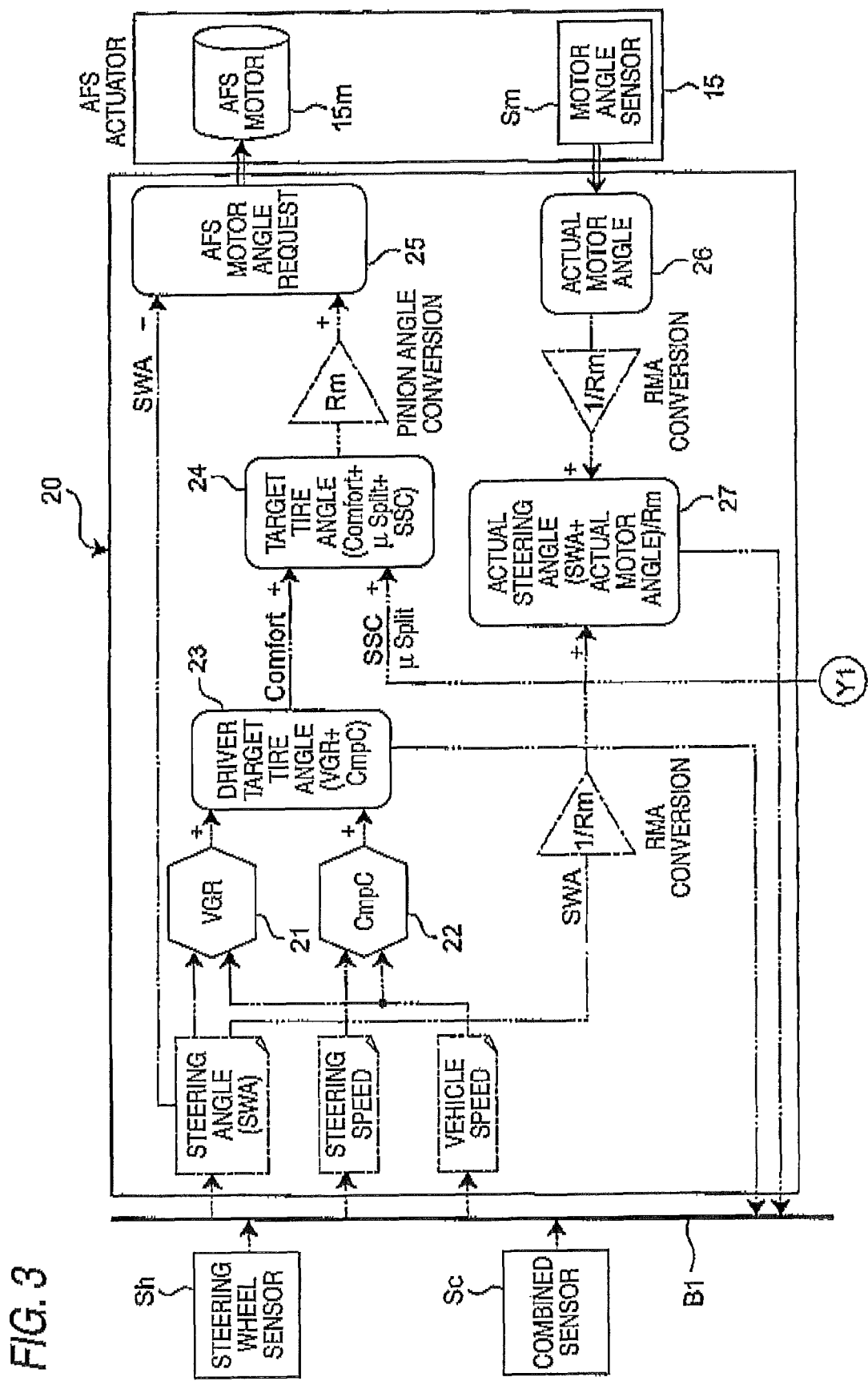
FIG. 3 is a block diagram for explaining the outline of the front wheel steering control by a steering control ECU according to the embodiment.
Figure 4:
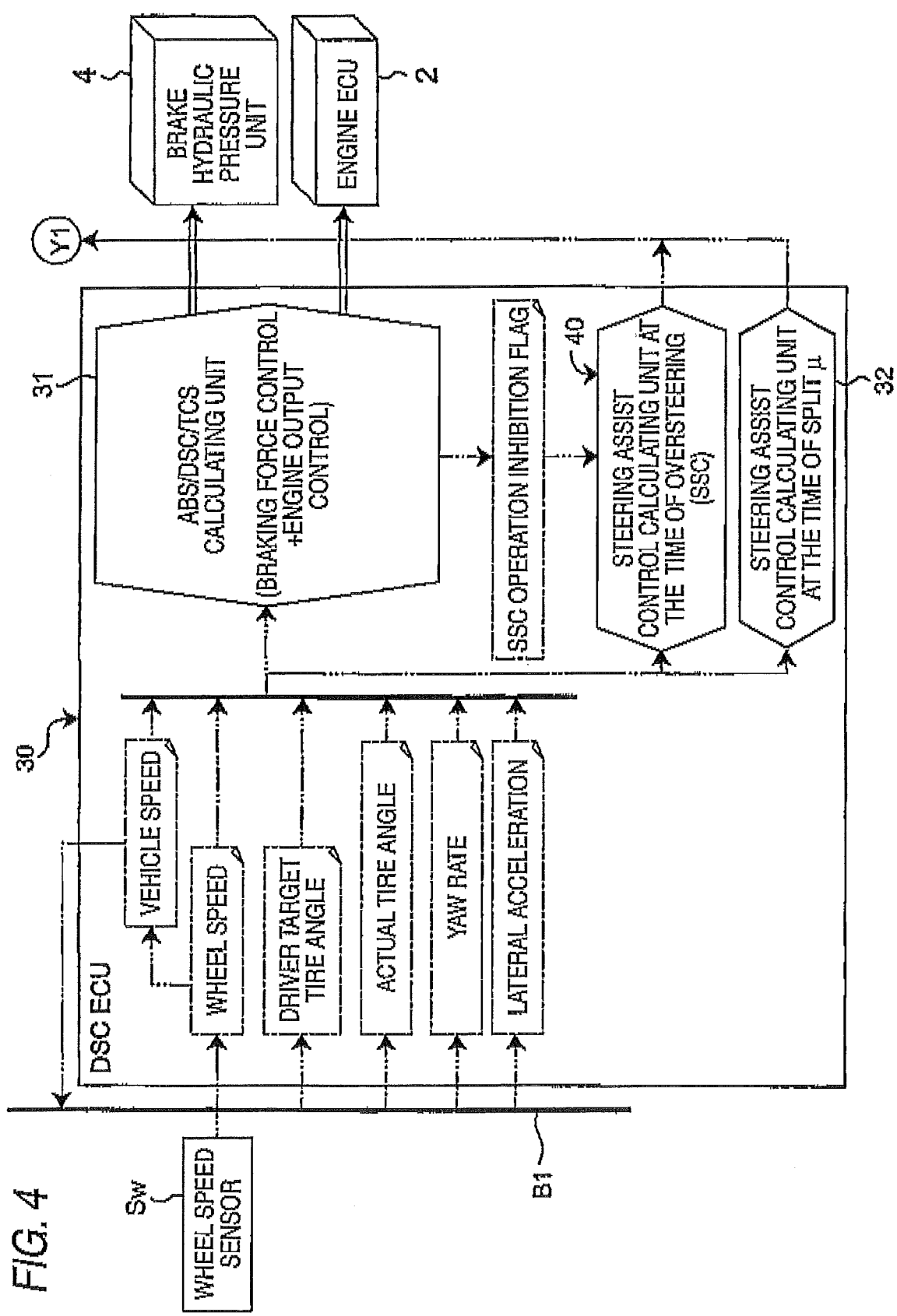
FIG. 4 is a block diagram for explaining the outline of the braking and engine control by a braking and engine control ECU according to the embodiment.

FIG. 3 is a block diagram for explaining the outline of the front wheel steering control by the steering control ECU 20, and FIG. 4 is a block diagram for explaining the outline of the braking and engine control by the braking and engine control ECU 30 according to the embodiment.

The front wheel steering apparatus 10 according to the embodiment includes an electric power steering mechanism which assists a driver in the steering (steering wheel manipulation) of the steering wheel 11 by the driver, and is of a type referred to as a so-called active front steering (hereinafter refer to as "AFS") which is able to calculate a driver target tire angle according to the steering wheel manipulation of the driver, and calculate a target tire angle by adding other control variables in response to the driving conditions of the vehicle so that an actual tire angle becomes the target tire angle. The steering actuator 15, which is also referred to as AFS actuator, includes an AFS motor 15$m$, and has a motor angle sensor Sm for detecting the motor angle of the AFS motor 15$m$ attached thereto (refer to FIG. 3).

The steering control ECU 20 (refer to FIG. 3), which is also referred to as an AFS ECU, includes a so-called variable gear ratio (VGR) mechanism unit 21 which makes it possible to change a gear ratio showing a ratio of a tire turning angle to a steering wheel steering angle, and a compliance compensation (CmpC) mechanism unit 22 which can accelerate the phase of the tire angle to the steering angle speed, thereby increasing the responsiveness of a vehicle behavior to a steering wheel manipulation.

The steering control ECU 20 includes a driver target tire angle calculating unit 23 which calculates a driver target tire angle according to the steering wheel manipulation of the driver on the basis of a steering angle, a VGR value obtained in the VGR mechanism unit 21, and a CmpC value obtained in the CmpC mechanism unit 22, and a target tire angle calculating unit 24 which calculates a final target tire angle by adding steering assist control variables at the time of split μ and an SSC control variable (which will be described later) to the driver target tire angle.

Figure 8:
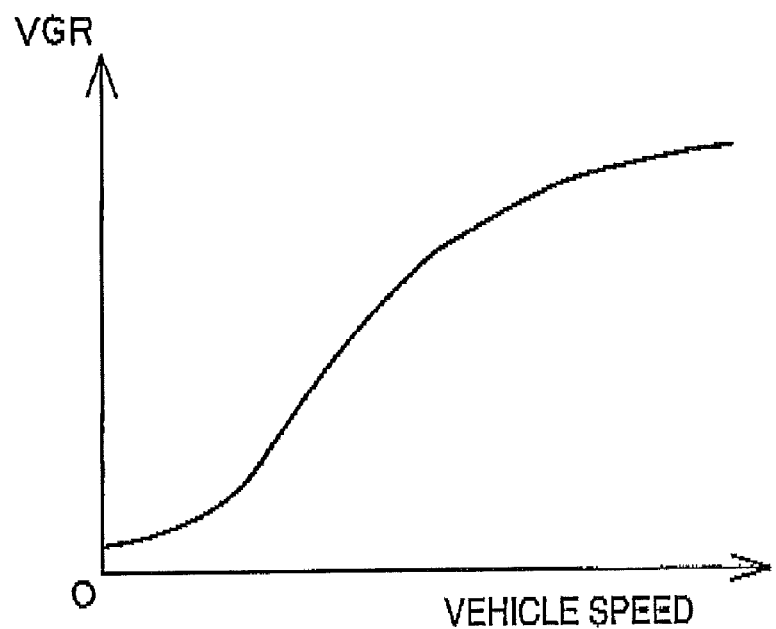
FIG. 8 is a view showing an example of a map for obtaining a VGR value according to a vehicle speed.
Figure 9:
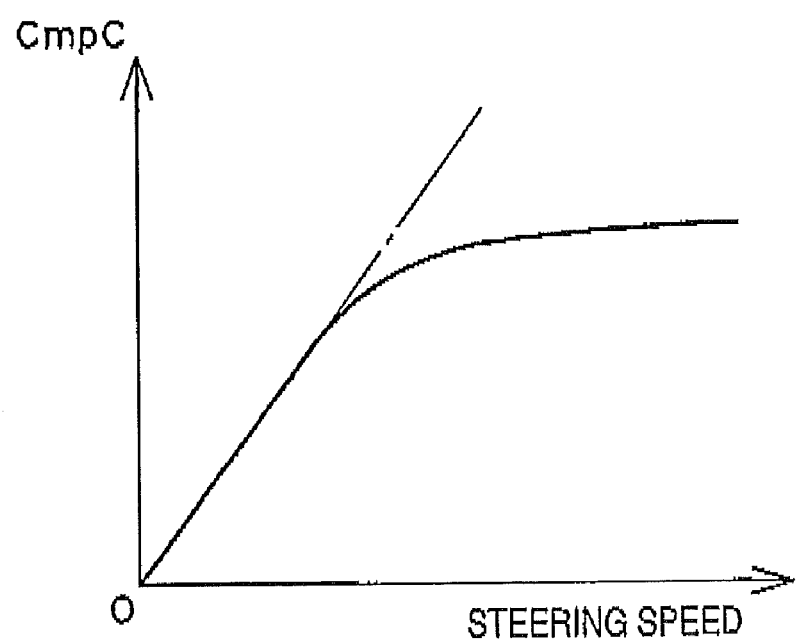
FIG. 9 is a view showing an example of a map for obtaining a CmpC value according to a steering speed.

An example of a map which is used, for example, when a VGR value according to a vehicle speed is obtained, is shown in FIG. 8, and an example of a map which is used, for example, when a CmpC value according to a steering speed is obtained, is shown in FIG. 9. These maps are stored in, for example, a ROM provided in the steering control ECU 20. In the map shown in FIG. 8, as the vehicle speed increases, the VGR value becomes large along a predetermined curve. In the map shown in FIG. 9, the CmpC value increases linearly as the steering speed increases until the steering speed is within a range of a certain value or less. If the steering speed increases beyond this range, an increase in the CmpC value approaches a saturation state.

Figure 22:
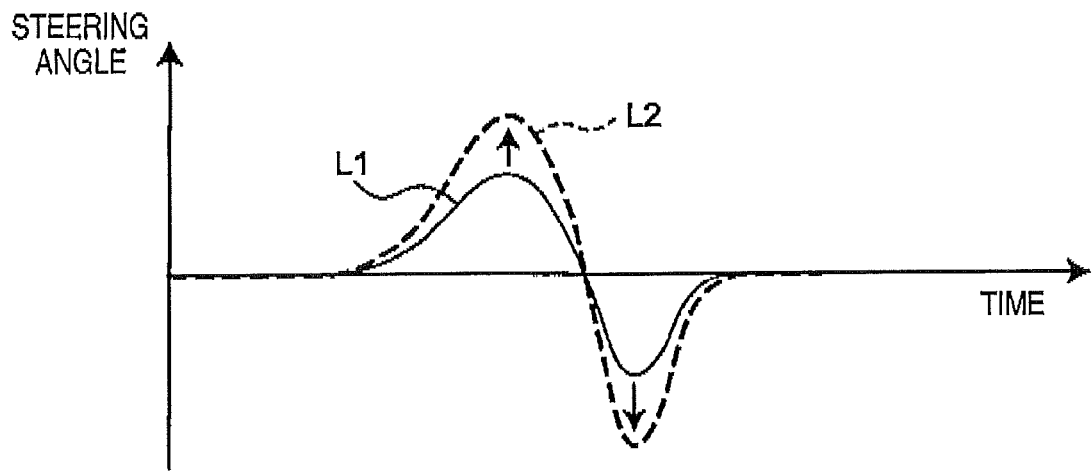
FIG. 22 is a schematic diagram showing a driver steering angle and a VGR request tire angle in a superimposed manner on a time axis.

In a case where the driver manipulates the steering wheel, the VGR value according to a vehicle speed is obtained by the VGR mechanism unit 21, and a gain (gear ratio) according to the vehicle speed is determined with respect to a driver steering angle. If this is expressed in terms of a pinion angle, as described with reference to FIG. 22, a VGR request tire angle (FIG. 22: broken line curve L2) of a waveform obtained by multiplying a waveform (FIG. 22: solid line curve L1) of a driver steering angle by a gain according to a vehicle speed is obtained. As for this VGR request tire angle, the correspondence to the driver steering angle generally becomes high as mentioned above, but coincidence with the behavior of the vehicle which responds to the steering wheel manipulation generally becomes low.

Figure 23:
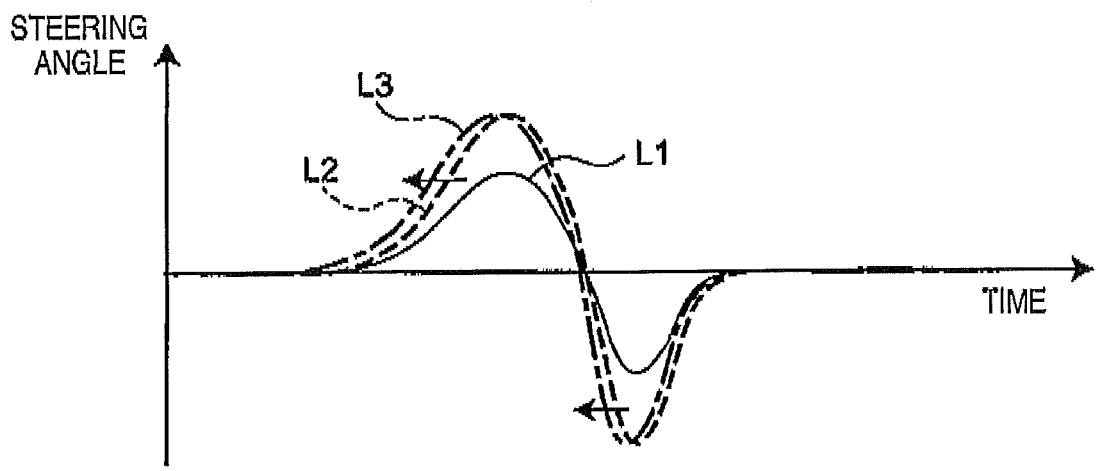
FIG. 23 is a schematic diagram showing a [VGR+CmpC] request tire angle obtained by further superimposing a CmpC request tire angle when the phase of the VGR request tire angle of FIG. 22 is advanced.

The CmpC value obtained in the CmpC mechanism unit 22 and the VGR value obtained in the VGR mechanism unit 21 are input to the driver target tire angle calculating unit 23. As the driver target tire angle, a request tire angle ([VGR+CmpC] request tire angle) whose phase has been advanced according to a steering speed at the time of a steering wheel manipulation with respect to the VGR request tire angle is calculated. If this is expressed in terms of the pinion angle, as described with reference to FIG. 23, the [VGR+CmpC] request tire angle (FIG. 23: "one-dot chain-line curve L3) of the waveform whose phase has been advanced (has been shifted by a predetermined amount to the left in FIG. 23) according to the steering speed at the time of the steering wheel manipulation is obtained with respect to the VGR request tire angle (FIG. 23: broken line curve L2). As for this [VGR+Cmpc] request tire angle, the correspondence to the driver steering angle generally becomes high as mentioned above, and coincidence with the behavior of the vehicle which has responded to the steering wheel manipulation generally becomes high.

Figure 24:
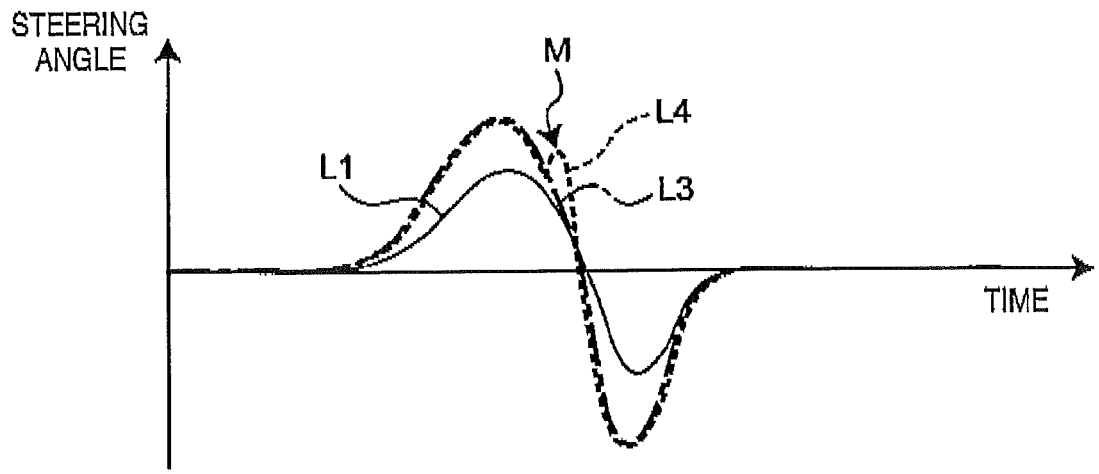
FIG. 24 is a schematic diagram showing a [VGR+CmpC+SSC] request tire angle obtained by further superimposing an SSC request tire angle on the [VGR+CmpC] request tire angle of FIG. 23.

In the target tire angle calculating unit 24, the final target tire angle is calculated by adding the steering assist control variable and SSC control variable at the time of split μ to the calculation value of the driver target tire angle ([VGR+CmpC] request tire angle) calculated in the driver target tire angle calculating unit 23. If this is expressed in terms of the pinion angle, for example, taking a case where the SSC control variable is added as an example, as described with reference to FIG. 24, the [VGR+CmpC+SSC] request tire angle (FIG. 24: broken line curve L4) which becomes the final request tire angle obtained by superimposing the request tire angle (SSC request tire angle) based on the steering angle control by the SSC control on the [VGR+CmpC] request tire angle (FIG. 24: one-dot chain line curve L3). In a case where unstable behavior has occurred in the vehicle in the SCC control, so-called counter steering compensation is performed as steering assist control of eliminating this unstable behavior. For this reason, as shown by a region M of the broken line curve L4 of FIG. 24, discontinuity will appear in a change in the [VGR+CmpC+SSC] request tire angle. Accordingly, as for this [VGR+CmpC+SSC] request tire angle, coincidence with the behavior of the vehicle which has responded to the steering wheel manipulation is generally high, but the correspondence to the driver steering angle generally becomes low.

In this embodiment, the calculation value of the [VGR+CmpC+SSC] request tire angle that is the final target tire angle calculated in the target tire angle calculating unit 24 is not input to a bus B1 as a signal. However, the calculation value of the [VGR+CmpC] request tire angle showing the driver target tire angle according to the steering wheel manipulation of the driver, which has been calculated in the driver tire angle calculating unit 23, is input to the bus B1 as a signal. When the braking and engine control ECU 30 performs the DSC control for vehicle stabilization control as will be described later at the time of the oversteering of the vehicle, the signal of the [VCR+CmpC] request tire angle is used as the steering angle signal.

In other words, the braking and engine control ECU 30 is configured such that a steering angle compensation quantity based on the SSC control at the time of the oversteering of the vehicle is not reflected in the steering angle signal which is used when performing the DSC control for vehicle stabilization control. This effectively suppresses deterioration of the controllability of the braking force control resulting from appearance of discontinuity in a change in the tire turning angle, in a case where oversteering has occurred in the vehicle.

More specifically, the braking and engine control ECU 30 is configured so as to use as the steering angle signal used for the control at the time of the oversteering of the vehicle, the steering angle signal which is set on the basis of the calculation value ([VGR+CmpC] request tire angle) of the driver target tire angle based on the VGR value according to the driver steering angle and the vehicle speed and the CmpC value according to the steering speed and which does not reflect the steering angle compensation quantity based on the SSC control at the time of the oversteering of the vehicle. This effectively suppresses deterioration of the controllability of a braking force control resulting from appearance of discontinuity in a change in the tire turning angle while performing the braking control which has reflected an actual tire turning angle based on the steering wheel steering of the driver as much as possible, in a case where oversteering has occurred in the vehicle.

The steering control ECU 20 further includes an AFS motor angle request value calculating unit 25 which calculates a request value of an AFS motor angle, on the basis of the value obtained by converting the calculation value of the target tire angle into the pinion angle, and the steering wheel steering angle (SWA) detected by the steering wheel sensor Sh. The AFS actuator 15 (i.e., the AFS motor 15m) is driven on the basis of a request value obtained by the calculation in this AFS motor angle request value calculating unit 25. When the calculation value of the target tire angle is converted into the pinion angle, conversion is performed using Mechanical ratio Rm=Pinion angle/Tire angle (RWA) corresponding to the gear ratio of the rack/pinion of a steering mechanism.

The steering control ECU 20 includes an actual motor angle calculating unit 26 which calculates the actual motor angle of the AFS motor 15m, on the basis of a detection value of the motor angle sensor Sm, and is further provided with an actual steering angle calculating unit 27 which calculates an actual steering angle (an actual tire angle), on the basis of an RWA conversion value obtained by dividing this actual motor angle by the mechanical ratio Bin, and an RWA conversion value obtained by dividing the steering wheel steering angle (SWA) detected by the steering wheel sensor Sh by the mechanical ratio Rm. The actual tire angle calculation value obtained in this actual tire angle calculating unit 27, and the driver target tire angle calculation value obtained in the driver target tire angle calculating unit 23 are input to the braking and engine control ECU 30 via the bus B1.

The details of the steering control by the above the steering control ECU (AFS ECU) 20 will be described later.

As shown in FIG. 3, the steering wheel sensor Sh is connected to the bus B1, detection signals of the steering wheel sensor Sh, i.e., detection signals of the steering angle SWA of the steering wheel 11 and the steering speed (steering angle speed) of the steering wheel are input to the steering control ECU 20 via the bus B1. As a sensor which detects the yaw rate of yawing and lateral acceleration which are applied to the vehicle, a so-called combined sensor Sc which has both the functions of a yaw rate sensor and a lateral acceleration sensor is installed in a proper place of the vehicle body, and this combined sensor Sc is also connected to the bus B1.

As shown in FIG. 4, the braking and engine control ECU 30 includes an ABS/DSC/TCS calculating unit 31 which performs required calculations for an anti-looking braking system (hereinafter refer to as "ABS") for the braking control of controlling, mainly, a sideslip, etc. of the wheels at the time of braking, a dynamic stability control (DSC) system for, mainly, vehicle stabilization control, and a traction control system (hereinafter refer to as "TCS") for, mainly, suitable wheel slip control so that suitable braking force control and engine output control according to various vehicle states can be performed.

A wheel speed sensor Sw which is conventionally well-known is connected to the braking and engine control ECU 30. The vehicle speed is calculated on the basis of an input signal (wheel speed signal data) from this wheel speed sensor Sw. The calculation data of the vehicle speed is input to the steering control ECU 20 via the bus B1.

Detection signals of the combined sensor Sc, i.e., detection signals of the yaw rate and lateral acceleration are input to the braking and engine control ECU 30 via the bus B1. Moreover, respective pieces of data of the driver target tire angle and actual tire angle calculated in the steering control ECU 20 are input to the braking and engine control ECU 30 via the bus B1.

The DSC system has the function (appropriately referred to as a "DSC function" in the present specification) of controlling a braking force and/or engine output to the wheel so that the actual turning control variable of the vehicle becomes the target turning control variable at the time of turning manipulation.

The calculation value data obtained in the ABS/DSC/TCS calculating unit 31 is input as a signal to a braking hydraulic pressure unit 4 which controls the braking hydraulic pressure of each wheel, and an engine ECU 2 which controls the operation of an engine itself, and is used for suitable braking force control and engine output control according to vehicle states.

The braking and engine control ECU 30 includes a split μ steering assist control calculating unit 32 which calculates the steering assist control variable for eliminating the unstable behavior of the vehicle caused by the split in a case where so-called split μ that a difference above a predetermined value exists in the value of a road surface friction coefficient (road surface μ) has occurred in the right and left wheels during vehicle traveling. The calculation of such steering assist control at the time of split μ is the same as the conventionally well-known content.

Moreover, in this embodiment, the braking and engine control ECU 30 includes a steering assist control calculating unit 40 for oversteering, which calculates a steering assist control variable for eliminating the unstable behavior of the vehicle by this oversteering, in a case where the oversteering has occurred at the time of turning, as a so-called steering stability control (SSC) function capable of controlling the steering angle RWA (also referred to as a turning or a steering angle) of wheels (right and left wheels FL and FR) so that the actual turning control variable of the vehicle becomes the target turning control variable at the time of turning manipulation.

In this embodiment, the DSC system preferably operates to detect an oversteering state even in a case where there is no brake manipulation by the driver. When the timing with which a braking force control is started by the DSC function is detected, the DSC system outputs an SSC operation inhibition flag which inhibits the operation of the SSC control so that the SSC control is stopped or resumes on the basis of this output.

Next, the steering assist control calculating unit 40 will be described at the time of oversteering.

Figure 5:
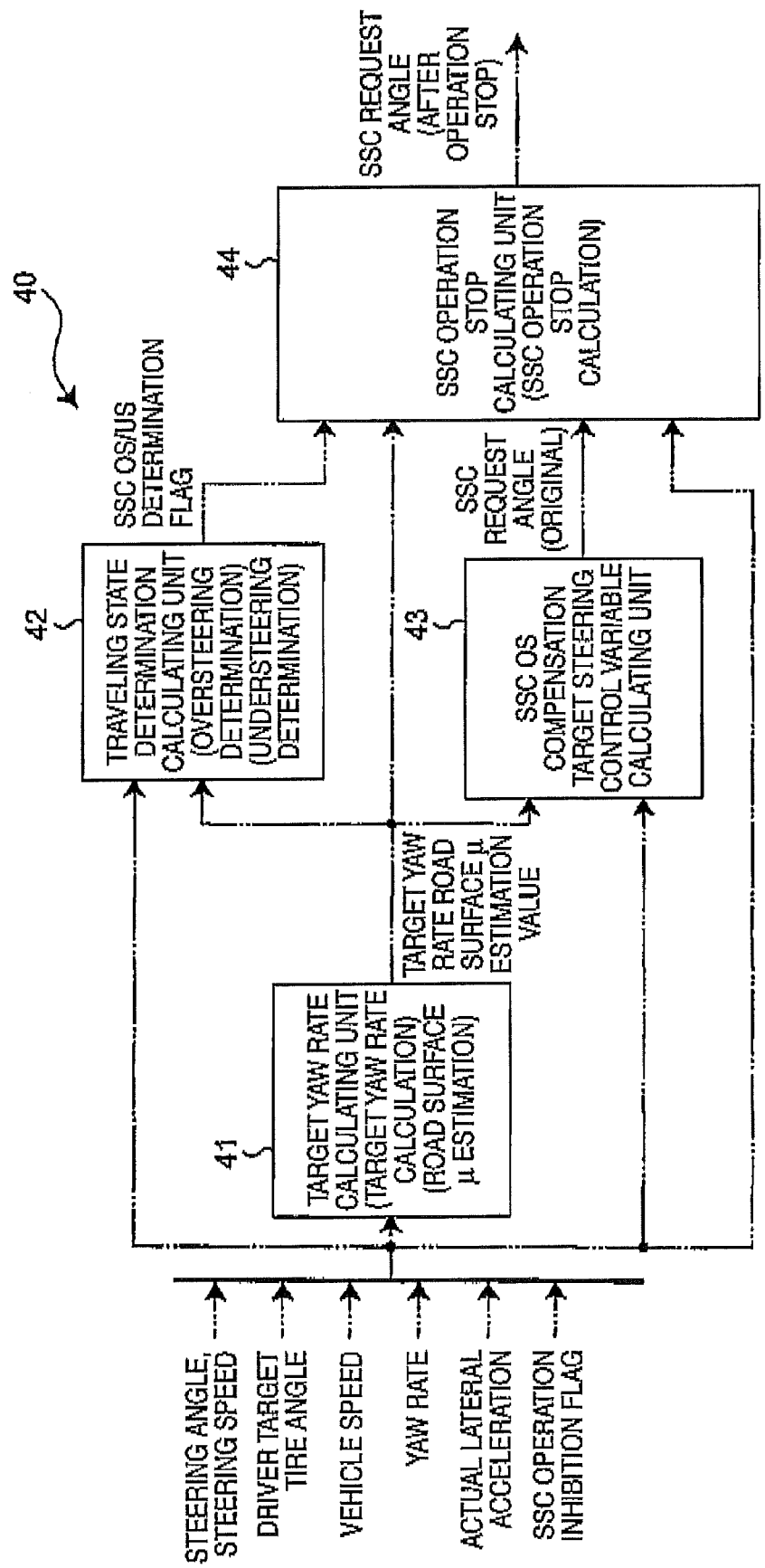
FIG. 5 is a block diagram for explaining the outline of the control by a steering assist control calculating unit at the time of oversteering according to the embodiment.
Figure 6:
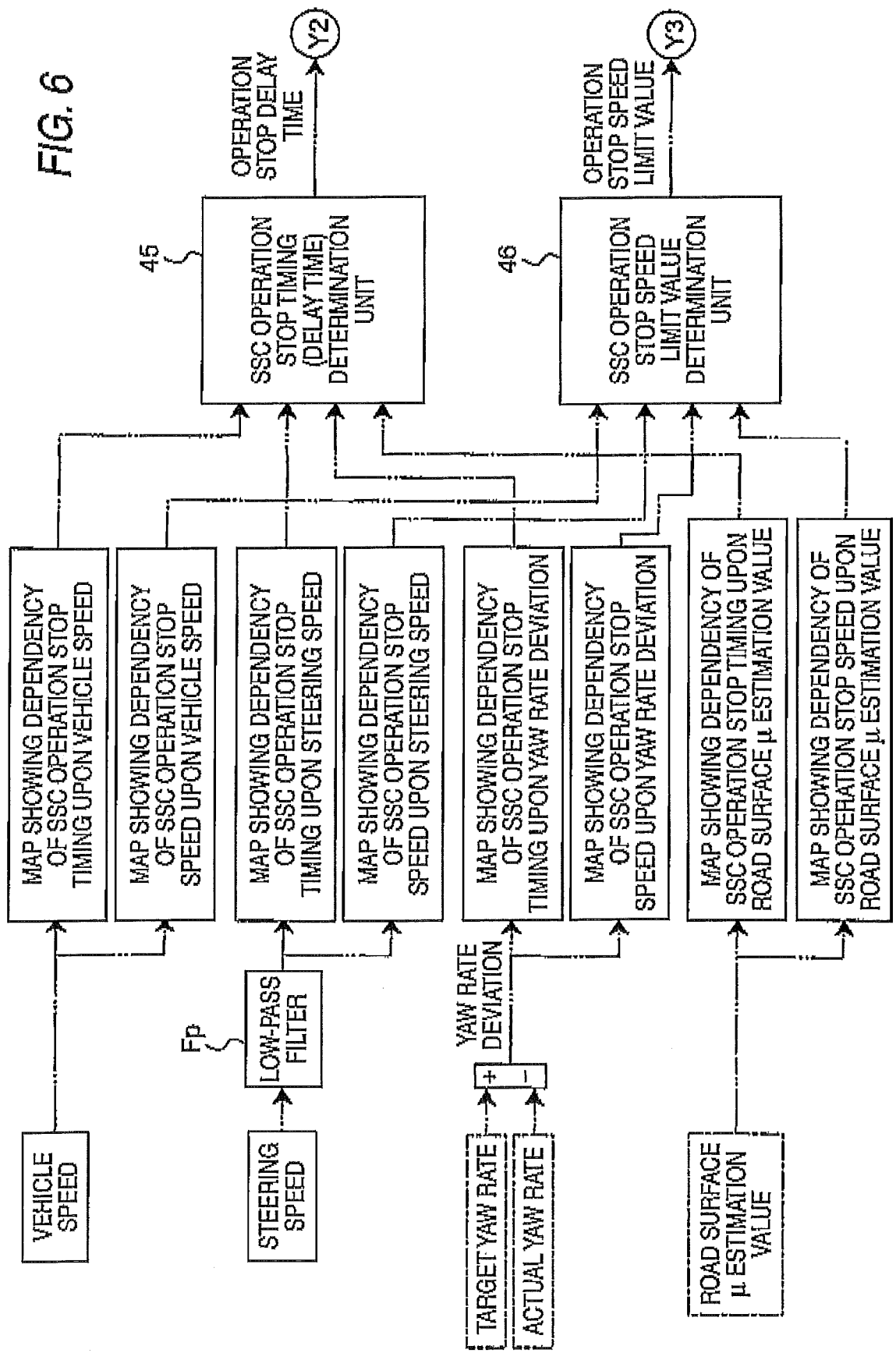
FIG. 6 shows a portion of a block diagram for explaining the outline of the control by an SSC operation stop calculating unit provided within the steering assist control calculating unit at the time of oversteering.
Figure 7:
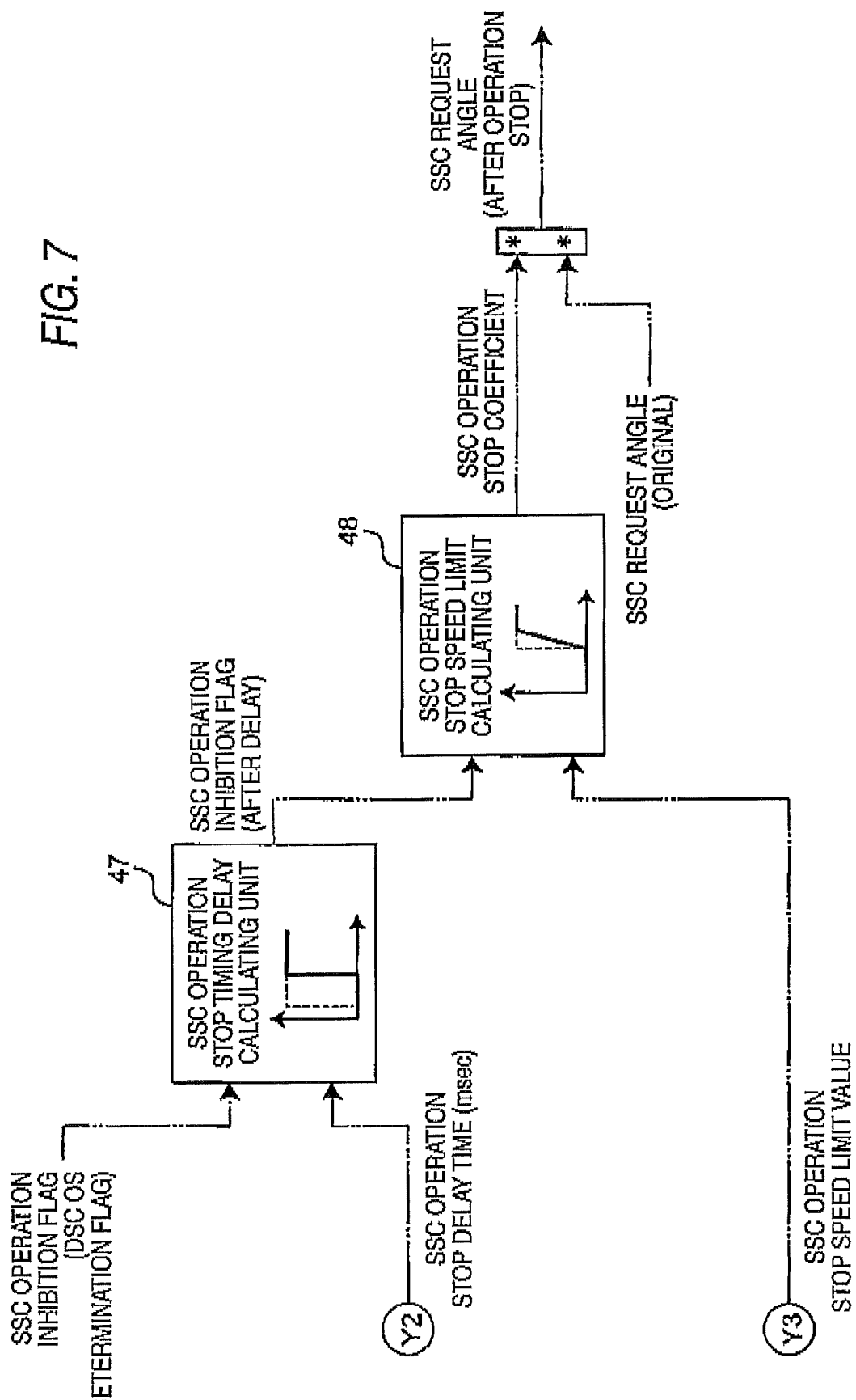
FIG. 7 shows a portion of a block diagram for explaining the outline of the control by the SSC operation stop calculating unit provided within the steering assist control calculating unit at the time of oversteering.

FIG. 5 is a block diagram for explaining the outline of the control by the steering assist control calculating unit 40 for oversteering. FIGS. 6 and 7 are block diagrams for explaining the outline of the control by an SSC operation stop calculating unit provided within the steering assist control calculating unit 40 for oversteering.

As shown in FIG. 5, to the steering assist control calculating unit 40 for oversteering is input respective data signals of the steering angle and steering speed, the driver target tire angle, the vehicle speed, the actual yaw rate, and the actual lateral acceleration, preferably, the SSC operation inhibition flag showing the information on the inhibition of operation of the SSC control. This SSC operation inhibition flag is a flag which changes from (0) to (1) in order to inhibit the operation of the SSC control in a case where the DSC system has detected the timing with which a braking force control is started by the DSC function and which is maintained at (0) in a state where the operation of the SSC control is not inhibited.

The steering assist control calculating unit 40 for oversteering includes a target yaw rate calculating unit 41 which calculates a target yaw rate, a traveling state determination calculating unit 42 which performs oversteering determination and understeering determination in the SSC control, an SSC OS compensation target steering control variable calculating unit 43 which calculates a target steering control variable of the oversteering (OS) compensation by an SSC function at the time of occurrence of oversteering (OS), and an SSC operation stop calculating unit 44 which calculates the timing of SSC operation stop, a limit to the vehicle speed, etc. in a case where this flag changes from (0) to (1), and the SSC operation is stopped according to the SSC operation inhibition flag input from the DSC system. The estimation of the road surface μ (road surface friction coefficient) which has an effect on the calculation of the SSC operation stop is performed in, for example, the target yaw rate calculating unit 41.

The target yaw rate calculating unit 41 calculates the target yaw rate by a well-known technique on the basis of signal data such as the steering angle and the steering speed. The traveling state determination calculating unit 42 compares the target yaw rate with the actual yaw rate, compares the difference between both yaw rates with a threshold value for oversteering and a threshold value for understeering, and if exceeding the threshold values or falling below the threshold values, performs oversteering determination or understeering determination to perform respective determination flags thereof.

The SSC OS compensation target steering control variable calculating unit 43 calculates the target steering control variable of the oversteering (OS) compensation by the SSC function, on the basis of the acquired signal data, target yaw rate, and road surface μ estimation value, at the time of the occurrence of oversteering (OS), and outputs an SSC request angle (original) to the SSC operation stop calculating unit 44.

The target yaw rate and road surface μ estimation value obtained in the target yaw rate calculating unit 41 are respectively input to the traveling state determination calculating unit 42, the SSC OS compensation target steering control variable calculating unit 43, and the SSC operation stop calculating unit 44. In a case where there is the oversteering (OS) determination or understeering (US) determination in the SSC control by the traveling state determination calculating unit 42, an OS determination flag or a US determination flag is input to the SSC operation stop calculating unit 44. Moreover, the target steering control variable of the oversteering (OS) compensation by the SSC function by the SSC OS compensation target steering control variable calculating unit 43, i.e., the SSC request angle of the oversteering is also input to the SSC operation stop calculating unit 44. In the SSC operation stop calculating unit 44, the SSC request angle after the SSC operation stop is calculated on the basis of the above input data, and a request value is output to the steering control ECU 20.

FIGS. 6 and 7 are block diagrams for explaining the outline of the control by the SSC operation stop calculating unit 44 provided within the steering assist control calculating unit 40 for oversteering. As shown in these FIGS. 6 and 7, the SSC operation stop calculating unit 44 includes an SSC operation stop timing determination unit 45 which determines the timing (delay time) with which the steering assist control calculating unit 40 for oversteering is made to stop the SSC operation actually after the SSC operation inhibition flag changes from (0) to (1), and an SSC operation stop speed limit determination unit 46 which determines the limit value of the stop speed when the SSC operation is stopped.

The SSC operation stop calculating unit 44 includes an SSC operation stop timing delay calculating unit 47 which performs the delay calculation of SSC operation stop timing (which will be described later) according to the SSC operation inhibition flag (DSC OS determination flag) and the output data of SSC operation stop delay time from the operation stop timing determination unit 45, an SSC operation stop speed limit calculating unit 48 which performs the calculation of the SSC operation stop speed limit (which will be described later) according to the input of the SSC operation inhibition flag and the output data of the SSC operation stop speed limit value from the operation stop speed limit determination unit 46, thereby outputting an SSC operation stop coefficient.

As will be described later, the SSC request angle after an operation stop is output to the steering control ECU 20, on the basis of the SSC operation stop coefficient from the SSC operation stop speed limit calculating unit 48, and an original SSC request angle.

A broken line graph within a block of the SSC operation stop timing delay calculating unit 47 shown in FIG. 7 schematically represents the operation stop timing before delay, and a solid line graph schematically represents the operation stop timing after delay. Additionally, a broken line graph within a block of the SSC operation stop speed limit calculating unit 48 schematically represents the operation stop speed before a speed limit, and a solid line graph schematically represents the operation stop speed after a speed limit.

As shown in FIG. 6, the timing (delay time) of the SSC operation stop by the operation stop timing determination unit 45 is determined using predetermined maps for delay, according to the vehicle speed, the steering speed, a yaw rate deviation (the deviation between the target yaw rate and the actual yaw rate), and the road surface estimation value. Additionally, the limit value of the stop speed at the time of the SSC operation stop by the operation stop speed limit determination unit 46 is determined using predetermined maps for stop speed limit, according to the vehicle speed, the steering speed, the yaw rate deviation, and the road surface μ estimation value. These maps are stored in, for example, an ROM attached to the steering assist control calculating unit 40 for oversteering. Since the steering speed generally has many noises, the steering speed is input to the steering assist control calculating unit 40 for oversteering via a low-pass filter Fp.

Figure 10A:
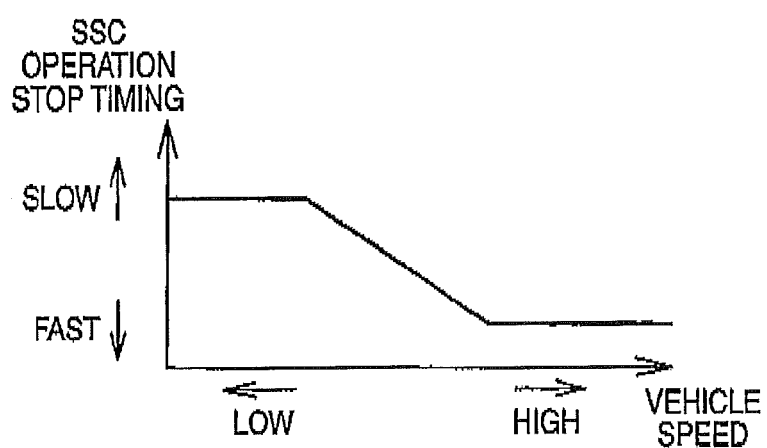
FIGS. 10A to 10D are views showing examples of maps for delay used in an SSC operation stop timing determination unit of the SSC operation step calculating unit.
Figure 10B:
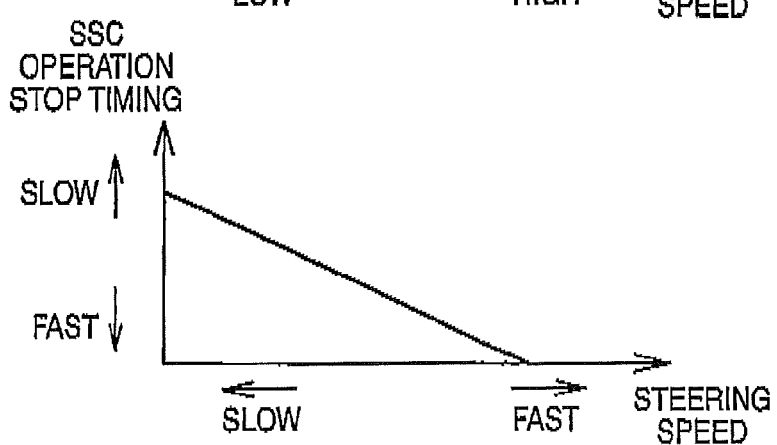
Figure 10C:
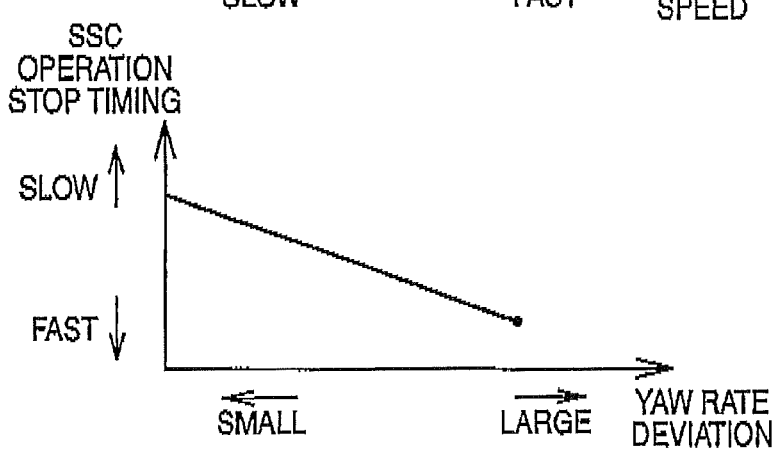
Figure 10D:
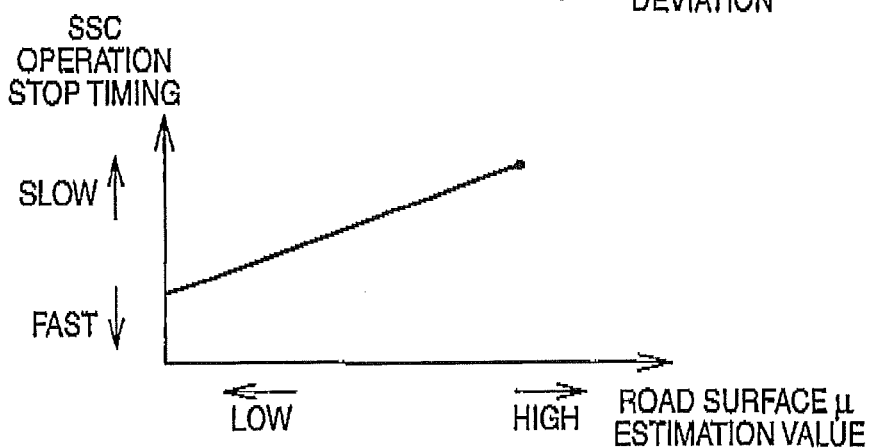

FIGS. 10A to 10D are views showing examples of maps for delay used in the SSC operation stop timing determination unit 45. FIG. 10A shows an example of a map showing dependency of the SSC operation stop timing upon the vehicle speed. FIG. 10B shows an example of a map showing dependency of the SSC operation stop timing upon the steering speed. FIG. 10C shows an example of a map showing dependency of the SSC operation stop timing upon the yaw rate deviation. FIG. 10D shows an example of a map showing dependency of the SSC operation stop timing upon the road surface μ estimation value.

In the vehicle speed dependent map of FIG. 10A, the SSC operation stop timing has a slow constant value below a range where there is a vehicle speed. If this vehicle speed is exceeded, however, the timing becomes fast substantially linearly according to an increase in the vehicle speed, and if the vehicle speed further increases, the SSC operation stop timing becomes a fast constant value. In the steering speed dependent map of FIG. 10B, the timing becomes fast substantially linearly according to an increase in the steering speed. In the yaw rate deviation dependent map of FIG. 10C, the timing becomes fast as the yaw rate becomes large, and the timing becomes the fastest at a maximum value of the yaw rate deviation. Additionally, the road surface μ estimation value dependent map of FIG. 10D, the timing becomes slow substantially linearly as the road surface μ estimation value becomes high, and the timing becomes the slowest at a maximum value of the road surface μ estimation value.

The SSC operation stop timing determination unit 45 obtains delay times according to the vehicle speed, the steering speed, the yaw rate deviation, and the road surface μ estimation value, using the above maps for delay of FIGS. 10A to 10D, and determines the SSC operation stop timing with a minimum value of the delay times as a delay time.

Figure 11A:
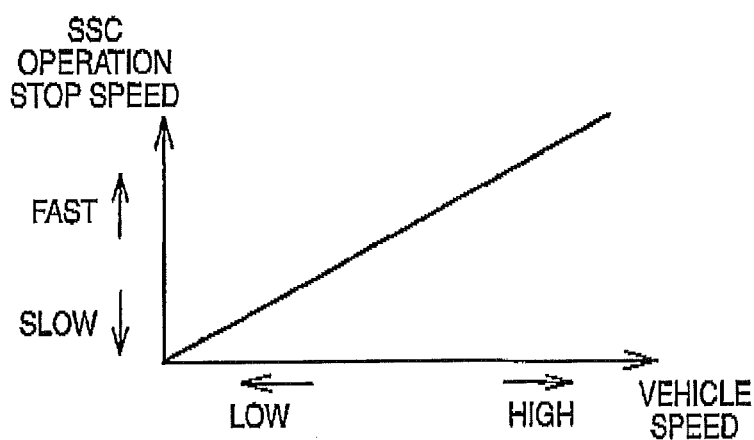
FIGS. 11A to 11D are views showing example of maps for speed limit used in an SSC operation stop speed limit value determination unit of the SSC operation stop calculating unit.
Figure 11B:
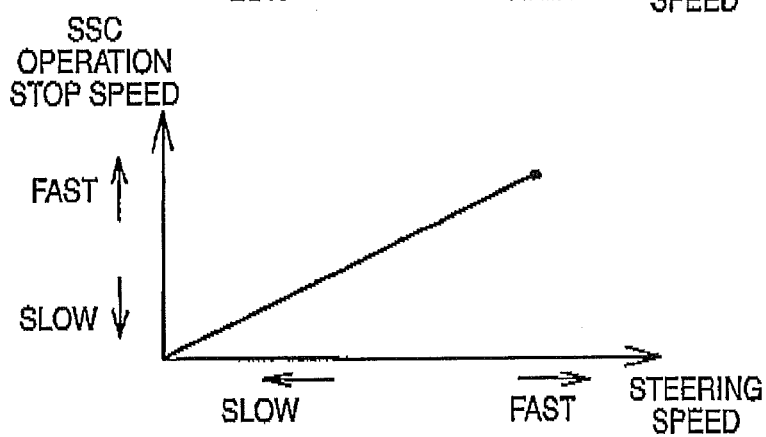
Figure 11C:
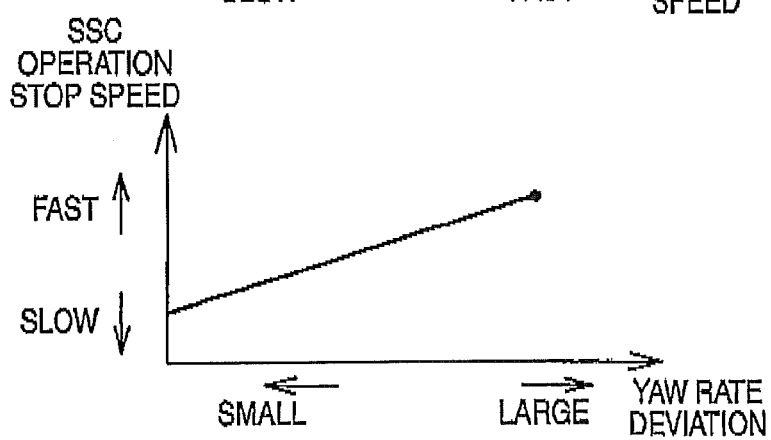
Figure 11D:
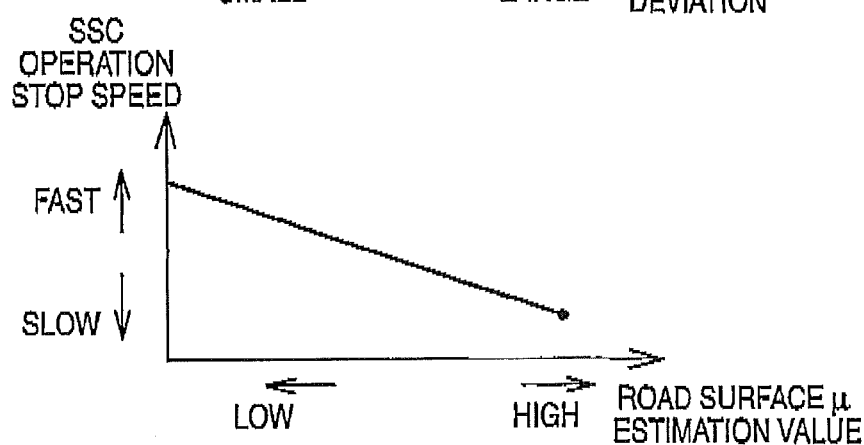

FIGS. 11A to 11D are views showing examples of maps for speed limit used in the SSC operation stop speed limit value determination unit 46, FIG. 11A shows an example of a map of the SSC operation stop speed limit dependent upon the vehicle speed, FIG. 11B shows an example of a map of the SSC operation stop speed limit dependent upon the steering speed, FIG. 11C shows an example of a map of the SSC operation stop speed limit dependent upon the yaw rate deviation, and FIG. 10D shows an example of a map of the SSC operation stop speed limit dependent upon the road surface μ estimation value.

In the vehicle speed dependent map of FIG. 11A, the limit value of the operation stop speed becomes faster substantially linearly as the vehicle speed increases. In the steering speed dependent map of FIG. 11B, the limit value of the operation stop speed becomes faster substantially linearly according to an increase in the steering speed, and the limit value of the operation stop speed becomes the fastest at a maximum value of the steering speed. In the yaw rate deviation dependent map of FIG. 11C, the limit value of the operation stop speed becomes faster substantially linearly as the yaw rate deviation becomes large, and the limit value of the operation stop speed becomes the fastest at a maximum value of the yaw rate deviation. Additionally, in the road surface μ estimation value dependent map of FIG. 11D, the limit value of the operation stop speed becomes slower substantially linearly as the road surface μ estimation value becomes high, and the limit value of the operation stop speed becomes the slowest at a maximum value of the road surface μ estimation value.

The operation stop speed limit determination unit 46 obtains limit values of the operation stop speed according to the vehicle speed, the steering speed, the yaw rate deviation, and the road surface μ estimation value, using the above maps for speed limit of FIGS. 11A to 11D, and determines a minimum value of the limit values as the SSC operation stop speed limit value.

The operation control of the front wheel steering apparatus 10 configured as described above will be described, referring to the accompanying control flow charts.

Figure 12:
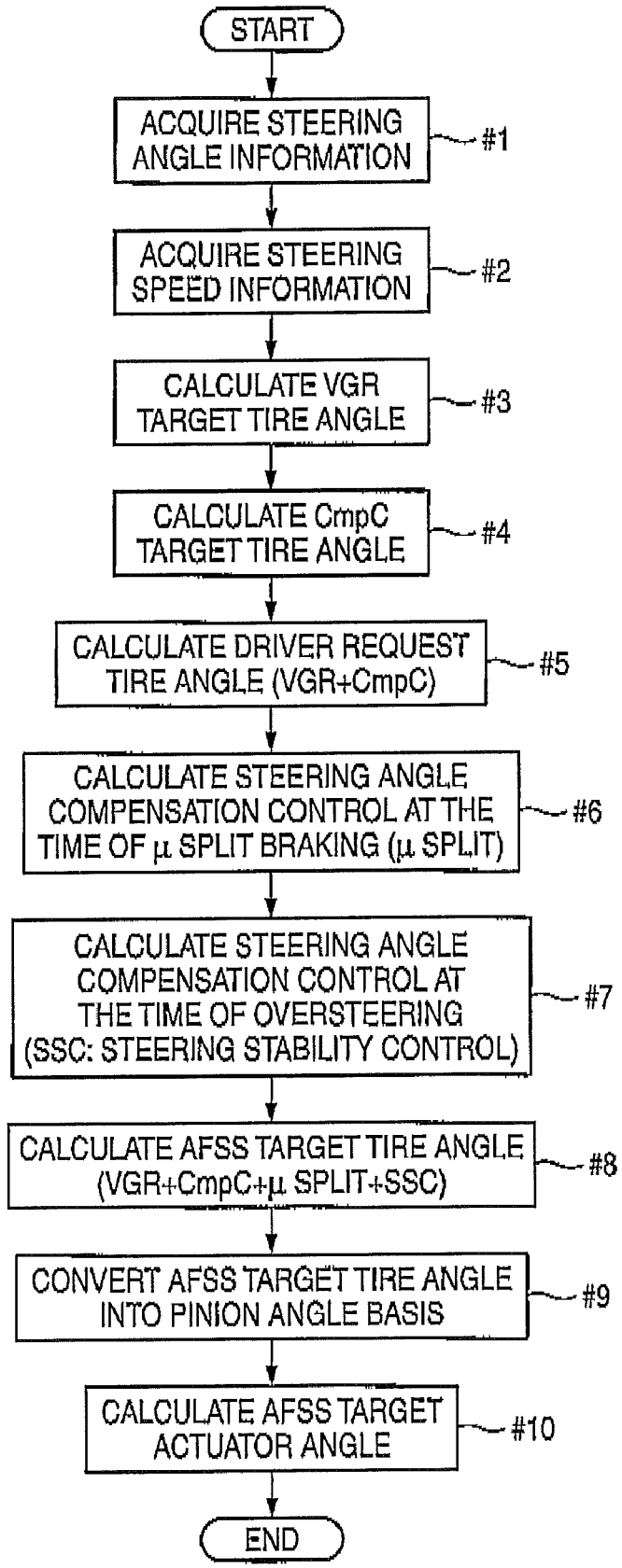
FIG. 12 is a flow chart for explaining the calculation processing of a target actuator angle in an AFS system of the front wheel steering apparatus.

FIG. 12 is a flow chart for explaining the calculation processing which calculates a request value of a target actuator angle (that is, the AFS motor angle shown in FIG. 3) in the AFS system (AFSS).

When a process is started, first, steering angle information and steering speed information are acquired on the basis of an output signal from the steering wheel sensor Sh (refer to FIG. 3), and are input to the CPU of the steering control ECU 20 shown in FIG. 3 (Steps #1 and #2).

Next, the VGR target (request) tire angle and the CmpC target (request) tire angle are respectively calculated in the VGR mechanism unit 21 and CmpC mechanism unit 22 of the steering control ECU 20 (Steps #3 and #4), and the driver target tire angle (VGR+CmpC) is calculated on calculation values of the VGR target tire angle and CmpC target tire angle in the driver target tire angle calculating unit 23 (Step #5).

In Step #6, the steering assist control variable at the time of split $\mu$ is calculated in the split $\mu$ steering assist control calculating unit 32 (refer to FIG. 4), and a compensation value ($\mu$ split compensation value) of the calculated steering angle is input to the target tire angle calculating unit 24 of the steering control ECU 20.

In Step #7 the steering assist control variable at the time of oversteering is calculated in the steering assist control calculating unit 40 (refer to FIG. 4) for oversteering, and the compensation value (SSC compensation value) of the calculated steering angle is input to the target tire angle calculating unit 24 of the steering control ECU 20.

Then, in Step #8, the target tire angle in the AFS system (AFSS) is calculated on the basis of the above driver request tire angle (VGR+CmpC) calculation value, the $\mu$ split compensation value, and the SSC compensation value, in the target tire angle calculating unit 24 of the steering control ECU 20 (AFSS target tire angle=VGR+CmpC+$\mu$ split+SSC).

In this embodiment, as mentioned above, the calculation value of the [VGR+CmpC+SSC] request tire angle that is a final target tire angle calculated in the target tire angle calculating unit 24 is not input to the bus B1 as a signal, but the calculation value of the [VGR+CmpC] request tire angle showing the driver target tire angle according to the steering wheel manipulation of the driver, which is calculated in the driver target tire angle calculating unit 23, is input to the bus B1 as a signal. Thus, when the braking and engine control ECU 30 performs the DSC control for vehicle stabilization control as will be described later at the time of the oversteering of the vehicle, the signal of the [VGR+CmpC] request tire angle is used as a steering angle signal. In other words, the fact that the braking and engine control ECU 30 is configured, such that a steering angle compensation quantity based on the SSC control at the time of the oversteering of the vehicle is not reflected in the steering angle signal which is used when performing the DSC control for vehicle stabilization control is as mentioned above.

Thereafter, in Step #9, the AFSS target tire angle is converted into a pinion angle basis. This conversion, as mentioned above, is performed using Mechanical ratio Rm=Pinion angle/Tire angle (RWA).

Then, in Step 410, the request value of the AFSS target actuator angle (AFS motor angle) is calculated on the basis of the converted value of the AFSS target tire angle into the pinion angle basis in the AFS motor angle request value calculating unit 25.

Figure 13:
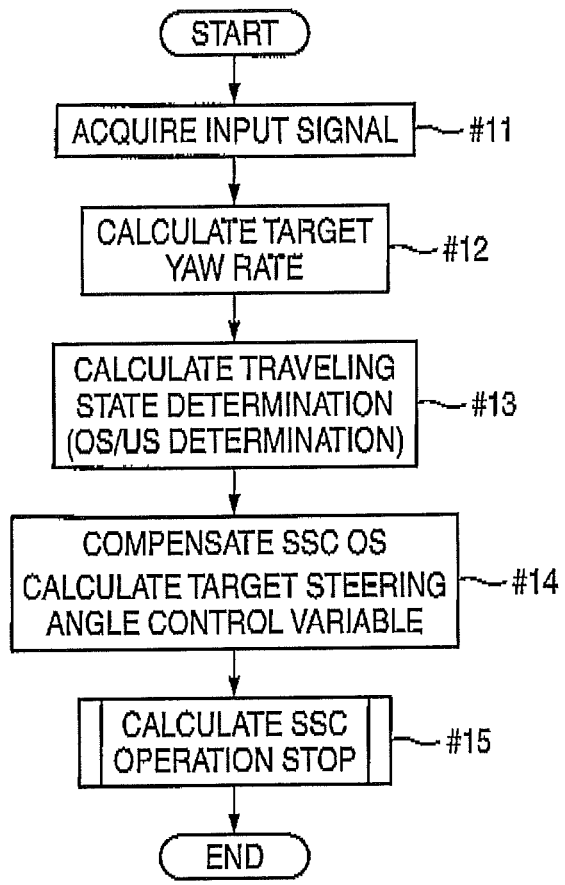
FIG. 13 is a flow chart for explaining the calculation processing of a steering assist control quantity at the time of the oversteering by the steering assist control calculating unit at the time of oversteering.

Next, the calculation of the steering assist control variable at the time of oversteering by the steering assist control calculating unit 40 (refer to FIG. 4) for oversteering will be described with reference to the flow chart of FIG. 13, in connection with the calculation processing in Step #7. As mentioned above, in this embodiment, the steering assist control calculating unit 40 for oversteering is provided within the braking and engine control ECU 30.

When the calculation processing is started, first, as shown in FIG. 5, the input signals of the steering angle, the steering speed, the driver target tire angle, the vehicle speed, the yaw rate and the actual lateral acceleration are acquired, and the SSC operation inhibition flag output from the ABS/DSC/TCS calculating unit 31 is further acquired (Step #11). Next, in Step #12, the target yaw rate is calculated in the target yaw rate calculating unit 41 on the basis of the acquired signal data (refer to FIG. 5). The estimation of the road surface $\mu$ is also performed in the target yaw rate calculating unit 41. The estimation value of the road surface $\mu$ and the target yaw rate are respectively input to the traveling state determination calculating unit 42, the SSC OS compensation target steering control variable calculating unit 43, and the SSC operation stop calculating unit 44.

Next, in Step #13, the determination calculation (the determination calculation of oversteering (OS)/understeering (US)) of the traveling state in the SSC control is performed in the traveling state determination calculating unit 42, and the SSC OS/US determination flag is input to the SSC operation stop calculating unit 44.

In Step #14, the target steering control variable of the oversteering (OS) compensation by the SSC function at the time of the occurrence of oversteering (OS) is calculated in the SSC OS compensation target control variable calculating unit 43, and is input to the SSC operation stop calculating unit 44 as an SSC request angle (original) that is the steering control request angle of an original by the SSC control, on the basis of this calculation value.

Then, in Step #15, an SSC operation stop calculation subroutine where the timing of the SSC operation stop, the vehicle speed limit, etc, are calculated in the SSC operation stop calculating unit 44 in a case where the SSC operation inhibition flag changes from (0) to (1) is executed.

Figure 14:
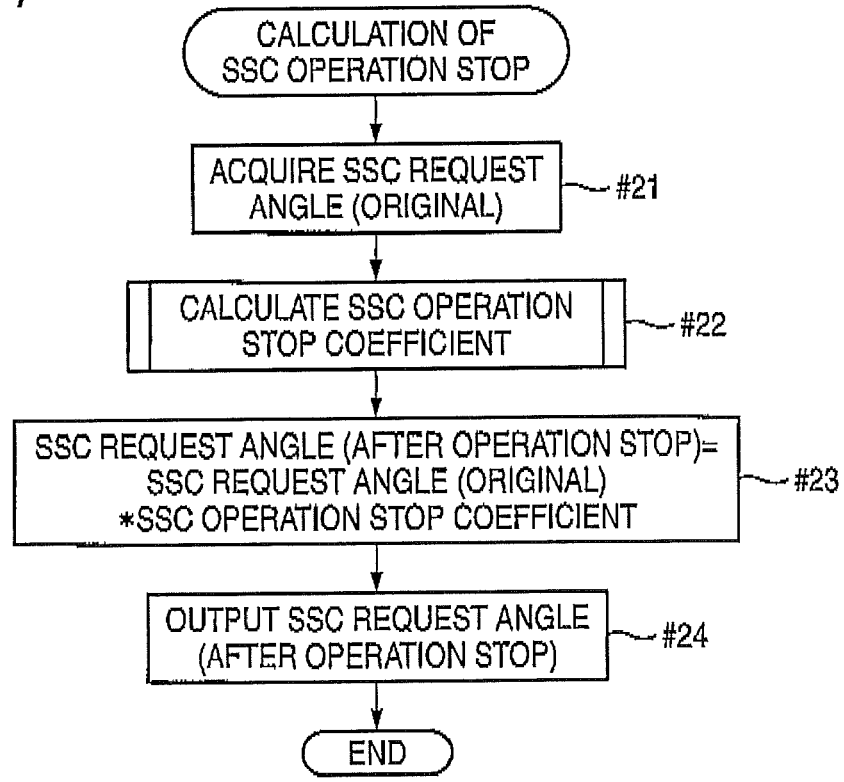
FIG. 14 is a flow chart for explaining an SSC operation stop calculation subroutine.

FIG. 14 is a flow chart for explaining the SSC operation stop calculation subroutine (Step #15).

When the execution of this subroutine is started, first, the SSC request angle (original) is acquired from the SSC OS compensation target steering control variable calculating unit 43 (Step #21), and then, an SSC operation stop coefficient calculation subroutine (which will be described later) is executed to calculate the SSC operation stop coefficient (Step 422). Then, the SSC request angle (after an operation stop) that is the SSC request angle after an SSC operation stop by multiplying the SSC request angle (original) by the SSC operation stop coefficient (Step 23), and this calculation value is output to the steering control ECU 20.

Figure 15:
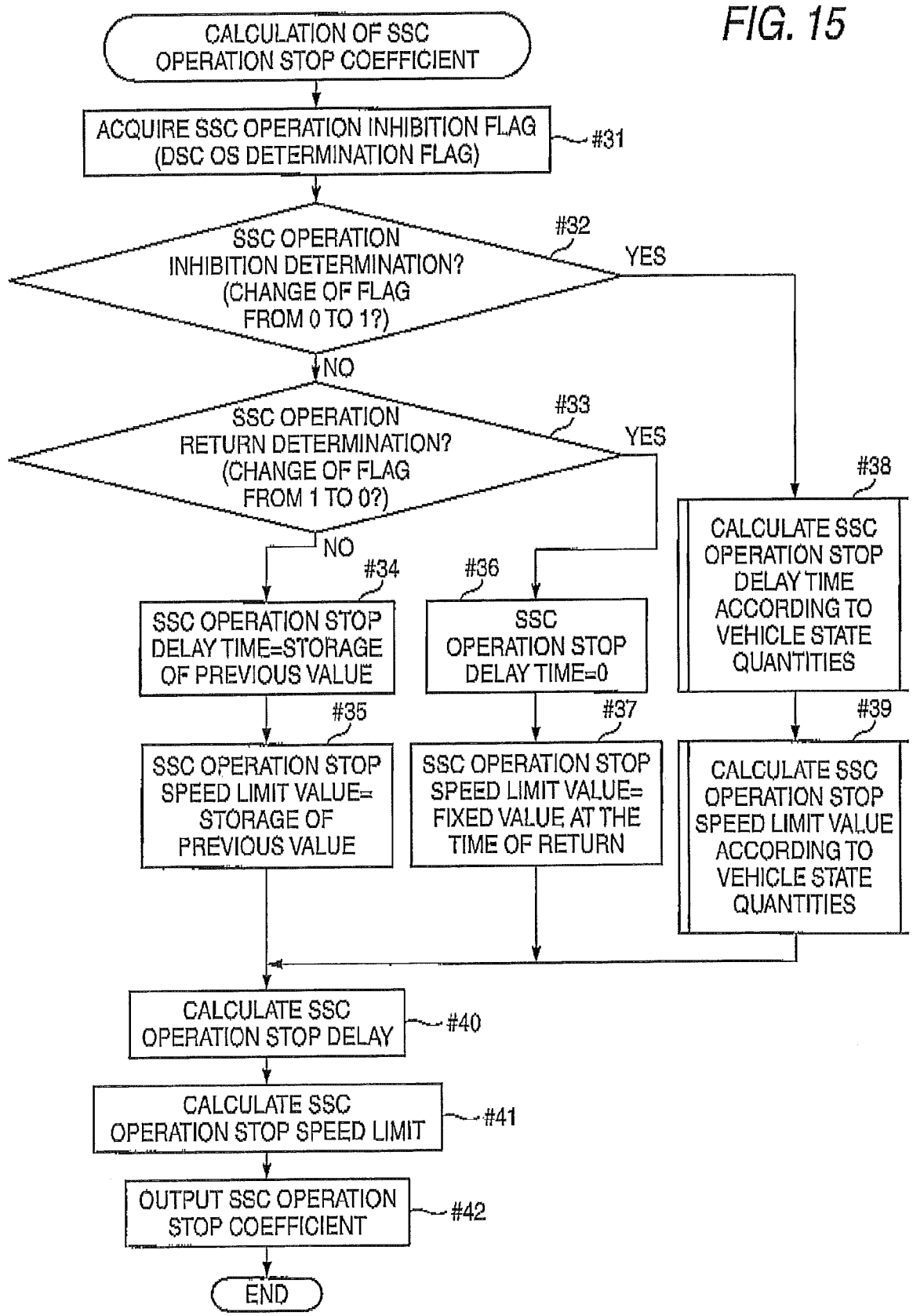
FIG. 15 is a flow chart for explaining SSC operation stop coefficient calculation subroutine.

FIG. 15 is a flow chart for explaining the SSC operation stop coefficient calculation subroutine (Step #22).

When the execution of this subroutine is started, first, the SSC operation inhibition flag (DSC OS determination flag) is acquired in Step #31, and it is determined whether or not the SSC operation inhibition flag has changed from (0) to (1) in Step #32.

If the determination result of this Step #32 is NO, it is determined in Step #33 whether or not there has been any SSC operation carriage return determination, i.e., whether the SSC operation inhibition flag has returned from (1) to (0). If the determination result is NO, both the SSC operation stop delay time and the SSC operation stop speed limit value are stored as previous values (Steps #34 and #35). Then, SSC operation stop delay calculation and SSC operation stop speed limit calculation are executed (Steps #40 and #41) and the SSC operation stop coefficient is output (Step #42).

On the other hand, if the determination result in Step #33 is YES, setting is made such that the SSC operation stop delay time is fixed to 0 (zero), and the SSC operation stop speed limit value is fixed to a value at the time of return (Steps #36 and #37). Thereafter, respective steps from Step #40 to Step #42 are executed.

If the determination result of Step #32 is YES, an SSC operation stop delay time calculation subroutine according to vehicle state quantities, and an SSC operation stop speed limit value calculation subroutine according to vehicle state quantities are executed (Step #38 and #39). Thereafter, respective steps from Step #40 to Step #42 are executed.

Figure 16:
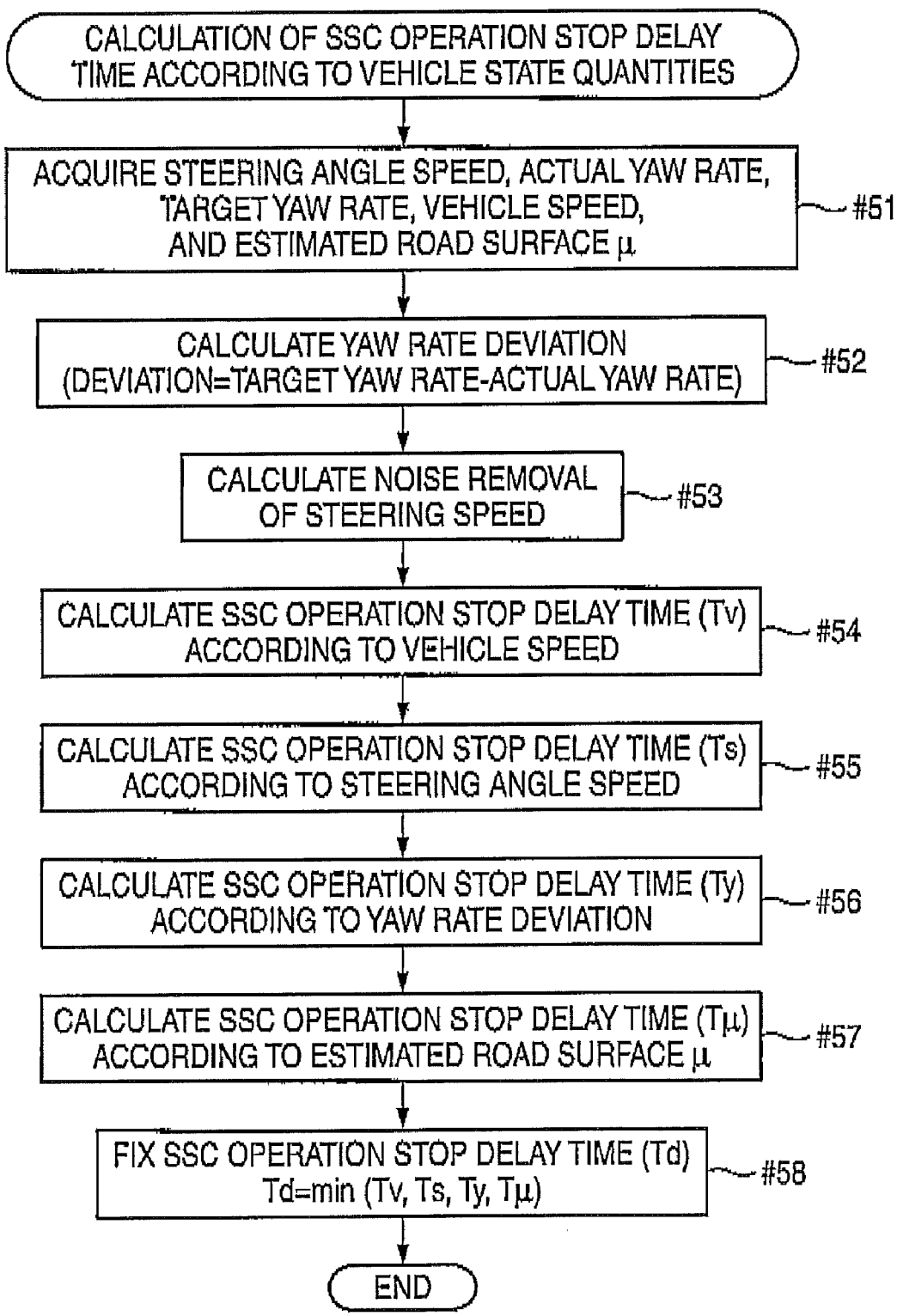
FIG. 16 is a flow chart for explaining an SSC operation stop delay time calculation subroutine according to vehicle state quantities.

FIG. 16 is a flow chart for explaining the SSC operation stop delay time calculation subroutine (Step #38) according to vehicle state quantities. This SSC operation stop delay time calculation subroutine according to vehicle state quantities is executed using maps of FIGS. 10A to 10D.

When the execution of this subroutine is started, first, the input data of the steering angle speed, yaw rate, target yaw rate, vehicle speed and surface road μ estimation value are acquired in Step #51, and the yaw rate deviation (Target yaw rate−Actual yaw rate) is calculated in Step #52. Noise removal calculation of the steering speed using the low-pass filter Fp (refer to FIG. 6) is performed in Step #53.

Next, in Step #54, an SSC operation stop delay time Tv according to vehicle speed is calculated using the map (refer to FIG. 10A) showing dependency of the SSC operation stop timing upon the steering speed. In Step #55, an SSC operation stop delay time Ts according to the steering angle speed is calculated using the map (refer to FIG. 10B) showing dependency of the SSC operation stop timing upon the yaw rate deviation. Moreover, in Step #56, an SSC operation stop delay time Ty according to the yaw rate deviation is calculated using the map (refer to FIG. 10C) showing dependency the SSC operation stop timing upon the yaw rate deviation.

In Step #57, an SSC operation stop delay time Tμ according to the road surface μ estimation value is calculated using the map (refer to FIG. 10D) showing dependency of the SSC operation stop timing upon the road surface μ estimation value.

Then, in Step #58, definite value Td=min (Tv, Ts, Ty, Tμ) of the SSC operation stop delay time is obtained by acquiring a minimum value of the above SSC operation stop delay times Tv, Ts, Ty, and Tμ.

Figure 17:
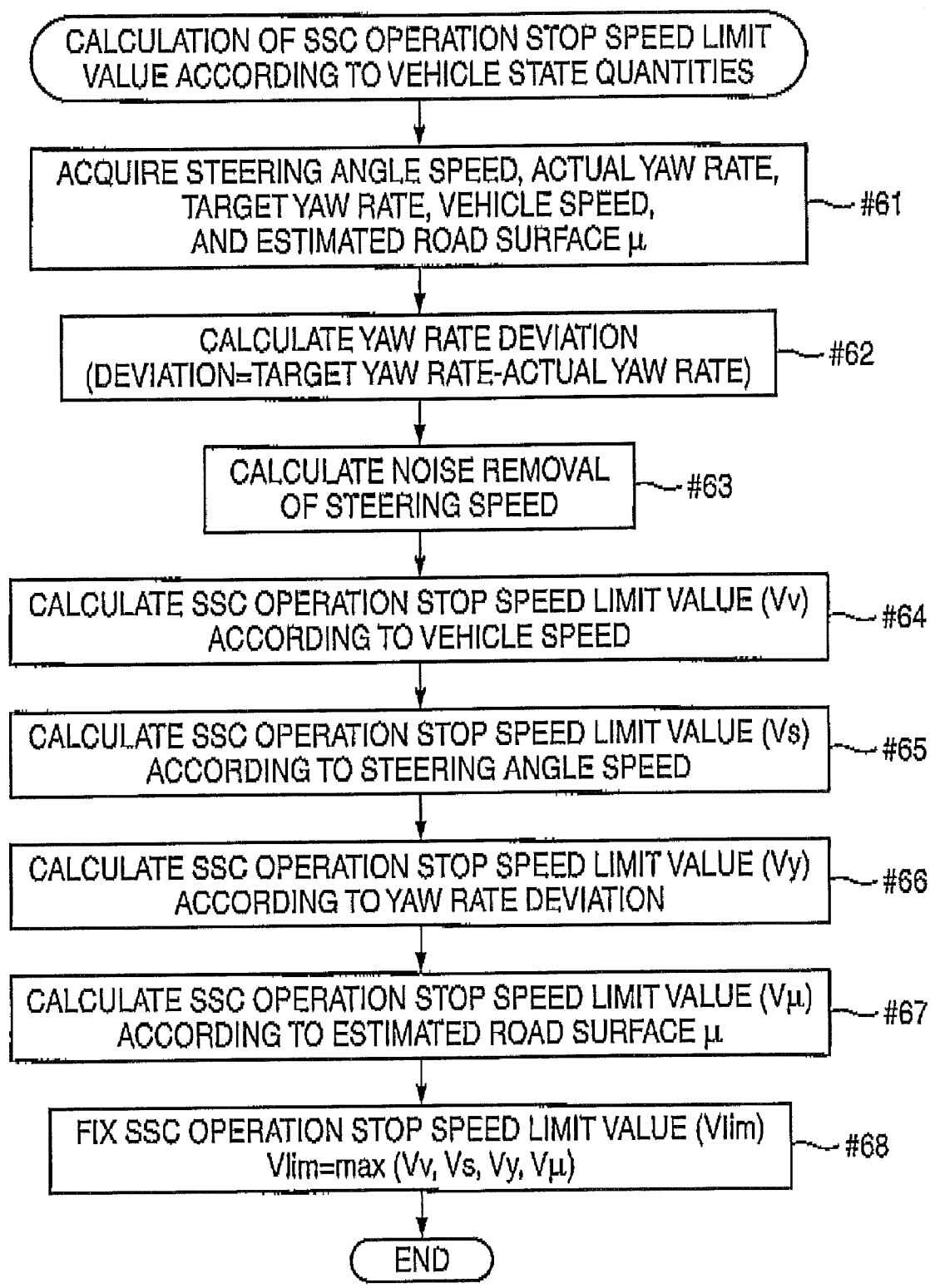
FIG. 17 is a flow chart for explaining an SSC operation stop speed limit value calculation subroutine according to vehicle state quantities.

FIG. 17 is a flow chart for explaining the SSC operation stop speed limit value calculation subroutine (Step #39) according to vehicle state quantities. This SSC operation stop speed limit value calculation subroutine according to vehicle states is executed using the maps of FIGS. 11A to 10D.

When the execution of this subroutine is started, first, the input data of the steering angle speed, yaw rate, target yaw rate, vehicle speed and surface road p, estimation value are acquired in Step #61, and the yaw rate deviation (Target yaw rate−Actual yaw rate) is calculated in Step #62. Noise removal calculation of the steering speed using the low-pass filter Fp (refer to FIG. 6) is performed in Step #63.

Next, in Step #64, an SSC operation stop speed limit value Vv according to the vehicle speed is calculated using the map (refer to FIG. 11A) showing dependency of the SSC operation stop speed limit value upon the vehicle speed. In Step #65, an SSC operation stop speed limit value Vs according to the steering angle speed is calculated using the map (refer to FIG. 11B) showing dependency of the SSC operation stop speed limit value upon the steering speed. Next, in Step #66, an SSC operation stop speed limit value Vy according to the yaw rate deviation is calculated using the map (refer to FIG. 11C) showing dependency of the SSC operation stop speed limit value upon the yaw rate deviation.

In Step #67, an SSC operation stop speed limit value Vμ according to the road surface μ estimation value is calculated using the map (refer to FIG. 11D) showing dependency of the SSC operation stop speed limit value upon the road surface μ estimation value.

Then, in Step #68, Definite value Vlim=max (Vv, Vs, Vy, Vμ) of the SSC operation stop speed limit value is obtained by acquiring a maximum value of the above SSC operation stop speed limit values Vv, Vs, Vy, and Vμ.

Figure 18:
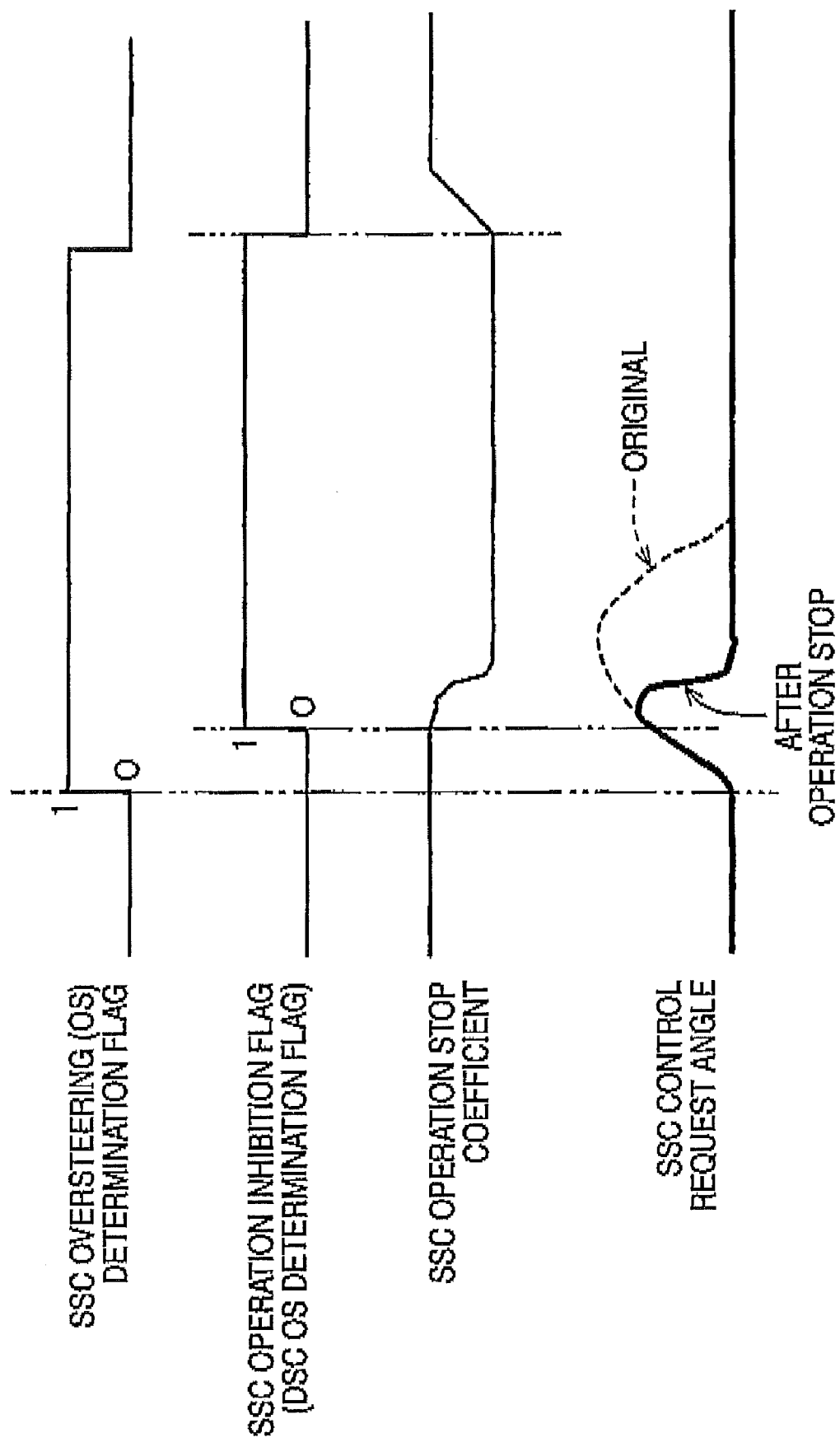
FIG. 18 is a timing chart regarding the change of an SSC oversteering (OS) determination flag, the change of an SSC operation inhibition flag, the change of an SSC operation stop coefficient, the change of an SSC request angle in SSC operation stop control.

FIG. 18 is a timing chart schematically illustrating the timings with which individual changes occur, regarding the change of the SSC oversteering (OS) determination flag, the change of the SSC operation inhibition flag, the change of the SSC operation stop coefficient, and the change of the SSC request angle in the SSC operation stop control.

As shown in this drawing, with respect to the occurrence of oversteering of the vehicle, the SSC oversteering determination by the SSC system is performed faster than the oversteering determination by the DSC system. That is, when a certain degree of time has passed after the SSC oversteering determination flag has changed from (0) to (1), the DSC oversteering determination flag (SSC operation inhibition flag) changes from (0) to (1).

The SSC request angle rises with the SSC oversteering determination by the SSC system. If the SSC operation inhibition flag is still (0), the SSC request angle becomes large as shown by a broken line (original). However, as the SSC operation inhibition flag changes to (1), the SSC request angle falls as shown by a solid line due to the SSC operation stop coefficient, and the operation of SSC is stopped.

Figure 19:
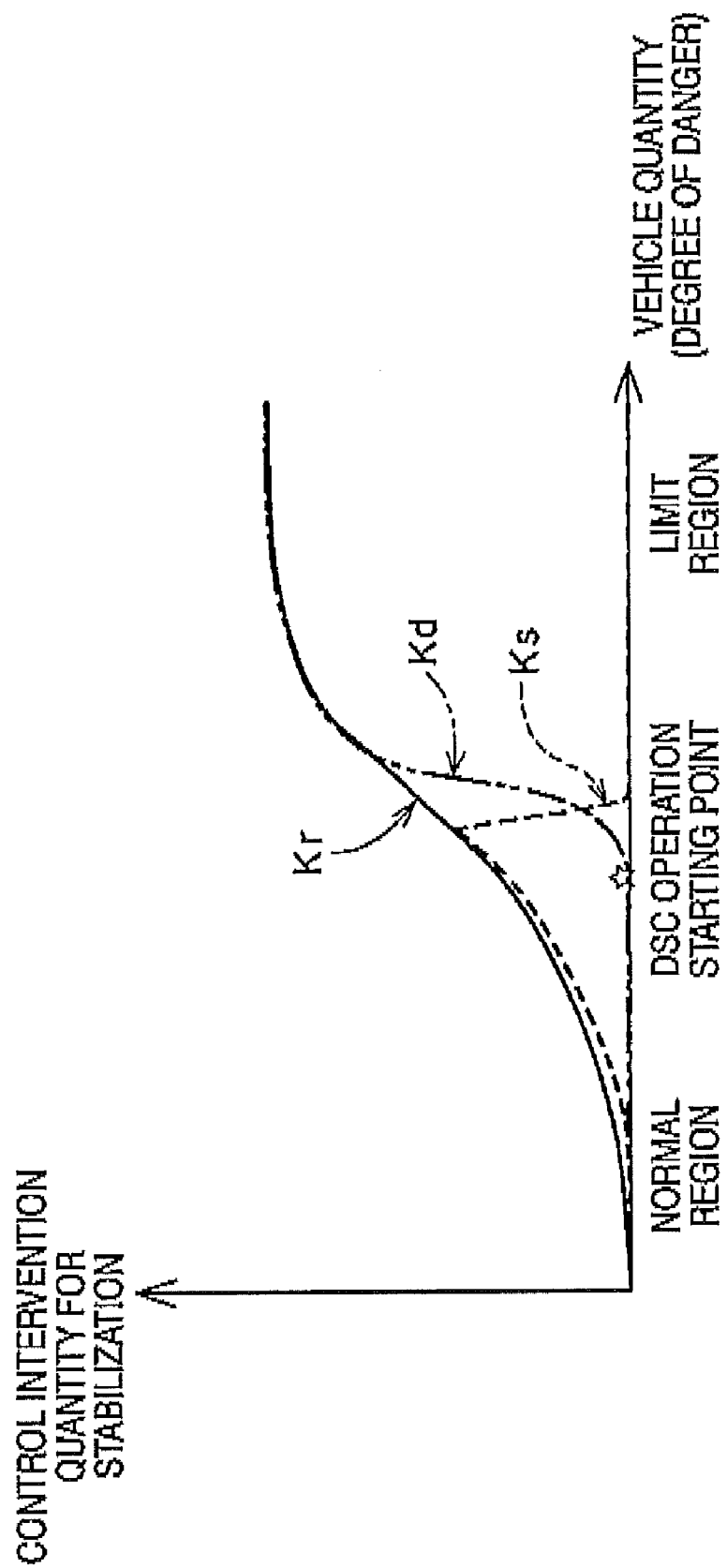
FIG. 19 is a graph schematically illustrating a control intervention quantity for stabilization in a case where a vehicle state reaches a limit region of oversteering from a normal region.

FIG. 19 is a graph schematically illustrating a control intervention quantity (i.e., a yaw moment compensation quantity by the steering angle control and braking force control) for stabilization in a case where a vehicle state reaches a limit region of oversteering from a normal region. In this drawing, a broken line curve Ks represents the control intervention quantity in a case where the steering angle control (i.e., SSC control) is independently performed, and a two-dot chain-line curve Kd represents the control intervention quantity in a case where the braking force control (i.e., DSC control) is independently performed. Additionally, a solid line curve Kr represents a control intervention quantity which is regarded as ideal.

As can be seen from FIG. 19, in this embodiment, in a case where oversteering has occurred at the time of turning manipulation when the motion control of a vehicle at the time of the turning manipulation is performed by combining the steering angle control with the braking force control, the steering of the driver is assisted only by the SSC control in a region from the normal region to a region where the compensation quantity of the yaw moment is relatively small. When the required compensation quantity of the yaw moment becomes a certain degree or more, and enters a limit region which exceeds the operation limit of the SSC control system, the operation of the DSC control system is started. In response to this start, the SSC control is preferably stopped with some delay. Since control is made based on a control intervention quantity obtained by the sum of the control intervention quantity Kd in the DSC control system and the control intervention quantity Ks in the SSC control system, the control based on the control intervention quantity very close to the solid line curve Kr representing a control intervention quantity which is regarded ideal is realized.

As described above, in this embodiment, preferably, in a case where oversteering has occurred at the time of turning manipulation, the stability of the vehicle behavior can be ensured by the following control. In the normal region and in a region from the region where the compensation quantity of the yaw moment is relatively small to the limit region where the yaw rate deviation becomes large and exceeds the operation limit of the SSC control, the steering of the driver is assisted by the SSC control, while in the limit region, the braking force over the steered wheel is controlled by the DSC control operations. Moreover, since the control of the SSC system is stopped by detecting the timing with which the DSC control system detects the oversteering state of the vehicle to start the DSC control, the driver can be effectively kept from feeling a sense of incompatibility when manipulating the steering wheel in the oversteering limit region. In the limit region, the DSC control is not used together with the SSC control unlike the conventional technique, but acts independently. Thus, the convergence of control when the braking force control by the DSC control is completed also improves significantly.

Since the control transition timing is preferably changed (delayed) by the SSC operation stop timing delay calculating unit 47 at the time of control stop of the SSC control system, the transition (stop) timing of the SSC control can be suitably set according to the driving conditions of the vehicle. Especially, the transition timing of control can be suitably set according to at least one of the vehicle speed, the steering speed, and the yaw rate deviation, the road surface friction coefficient that are state quantifies which have an effect on the stability of vehicle behavior. Moreover, preferably, since the control variables of the SSC control are gradually changed by the SSC operation stop speed limit calculating unit 48 at the time of control stop of the SSC control system, the transition of control can be suitably performed by suppressing a sudden change in the control variables according to driving conditions, etc. of the vehicle. Especially, the transition timing of control can be suitably set according to at least one of the vehicle speed, the steering speed, the yaw rate deviation, and the road surface friction coefficient that are state quantifies which have an effect on the stability of vehicle behavior.

In a case where the DSC control and the SSC control are used together in the limit region of oversteering like the conventional technique, it is necessary to allow the cooperation control of both the DSC system and the SSC system, and a large amount of time and cost will be required for both development and tuning. However, in this embodiment, preferably, the DSC system and the SSC system are not used together, but the respective systems can be independently developed and tuned, and the time and cost required for development can be significantly suppressed.

As described above, according to this embodiment, the steering angle compensation quantity based on the SSC control at the time of the oversteering of the vehicle is not reflected in a steering angle signal used when the braking and engine control ECU 30 performs the DSC control for vehicle stabilization control. Accordingly, in a case where oversteering has occurred in the vehicle, it is possible to suppress deterioration of the controllability of the braking force control resulting from the appearance of discontinuity in a change in the tire turning angle.

More specifically, the braking and engine control ECU 30 is configured so as to use, as the steering angle signal used for the control at the time of the oversteering of the vehicle, the steering angle signal which is set on the basis of the calculation value ([VGR+CmpC] request tire angle) of the driver target tire angle based on the VGR value according to the driver steering angle and the vehicle speed, and the CmpC value according to the steering speed and which does not reflect the steering angle compensation quantity based on the SSC control at the time of the oversteering of the vehicle. This effectively suppresses deterioration of the controllability of the braking force control resulting from appearance of discontinuity in a change in the tire turning angle while performing the braking control which has reflected the actual tire turning angle based on the steering wheel manipulation of the driver as much as possible, in a case where oversteering has occurred in the vehicle.

In the above embodiment, in a case where oversteering has occurred at the time of turning, the steering assist control calculating unit 40 for oversteering which calculates a steering assist control variable for eliminating the unstable behavior of the vehicle caused by the oversteering is provided in the braking and engine control ECU 30 as a so-called steering stability control (SSC) function. However, the invention is not limited to such a configuration, and the steering assist control calculating unit at the time of oversteering may be provided in the steering control ECU.

Next, a further embodiment of the invention will be described.

In the following description, the components which have the same configurations and perform the same operations as those in the above-described embodiment are denoted by the same reference numerals, and description thereof will be omitted.

Figure 20:
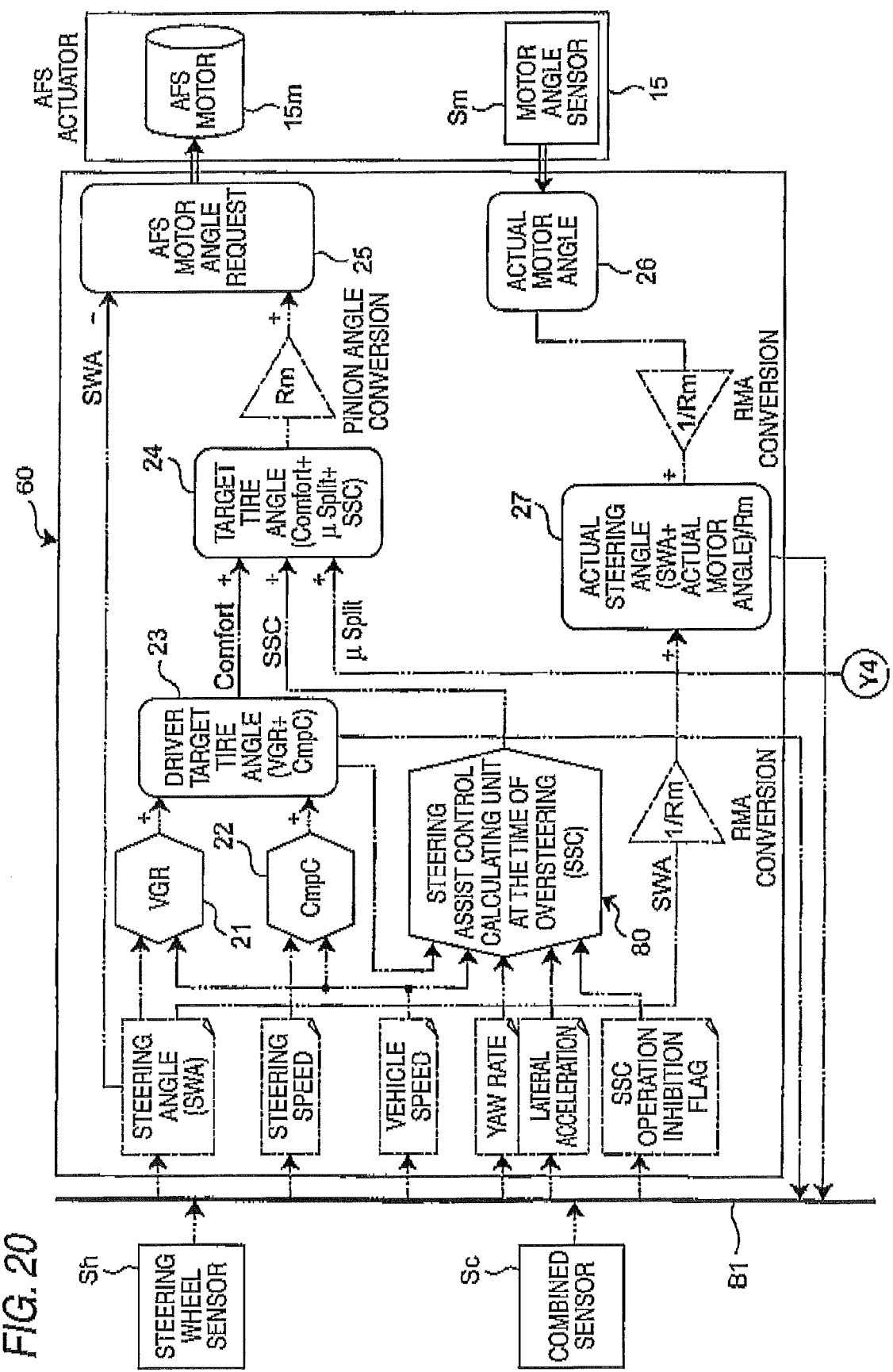
FIG. 20 is a block diagram for explaining the outline of the front wheel steering control by a steering control ECU according to a further embodiment of the invention.
Figure 21:
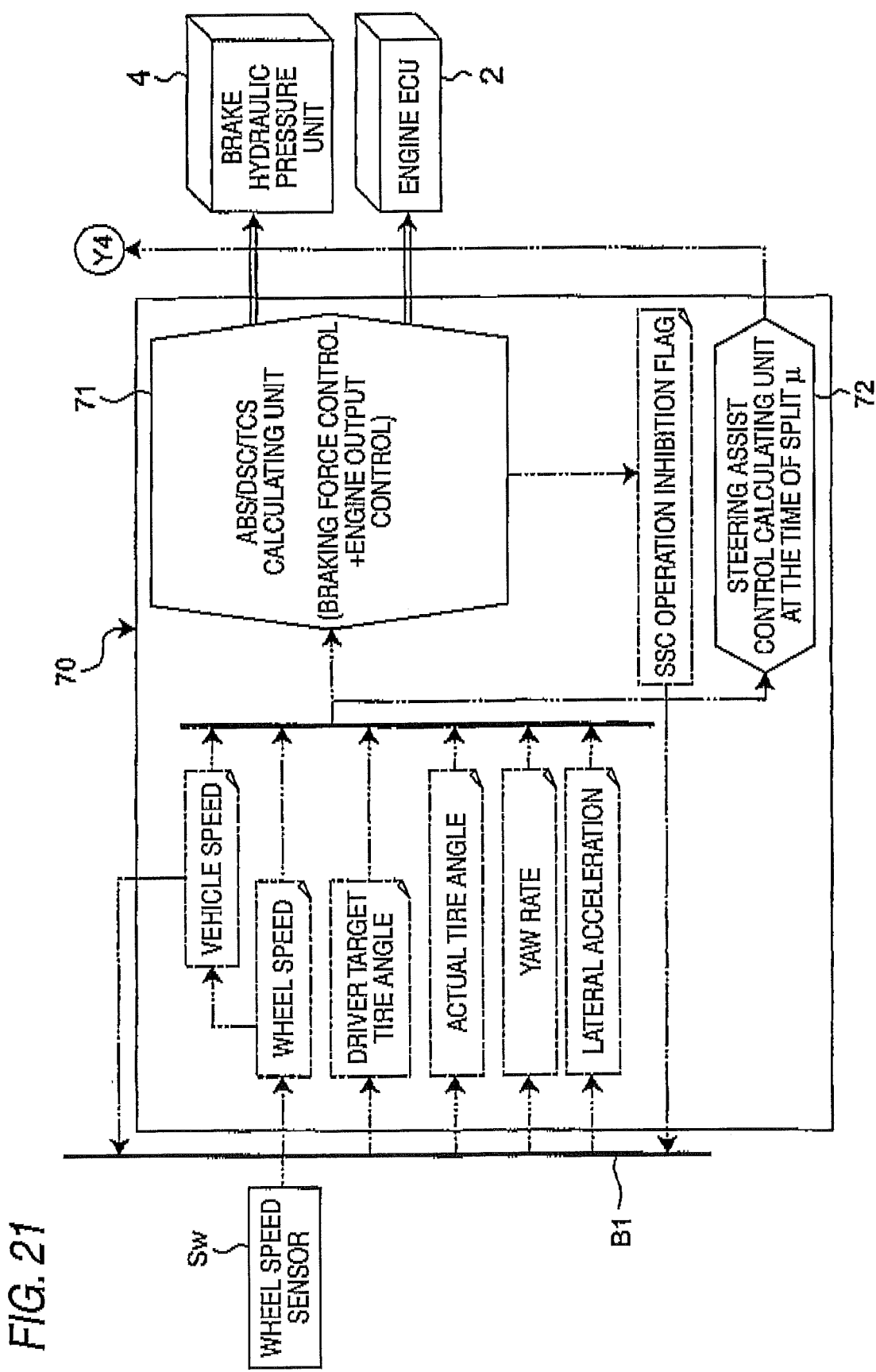
FIG. 21 is a block diagram for explaining the outline of the braking and engine control by a braking and engine control ECU according to the further embodiment.

FIG. 20 is a block diagram for explaining the outline of the front wheel steering control by the steering control ECU according to a further embodiment of the invention. Additionally, FIG. 21 is a block diagram for explaining the outline of the braking and engine control by the braking and engine control ECU according to the further embodiment.

As shown in these drawings, in this further embodiment, a steering assist control calculating unit 80 for oversteering which calculates the steering assist control variable for eliminating the unstable behavior of the vehicle is provided not within the braking and engine control ECU 70 but within the steering control ECU 60, and calculation data is input directly to the target tire angle calculating unit 24 within the steering control ECU 60. In the case, an SSC operation inhibition flag from an ABS/DSC/TCS calculating unit 71 is input to the steering assist control calculating unit 80 for oversteering via a bus 1. The calculation data by the split µ steering assist control calculating unit 72 is input directly to the target tire angle calculating unit 24 within the steering control ECU 60, similarly to the above-described embodiment.

In a case where such a configuration has been adopted, the same operational effects as hi the above-described embodiment are obtained. In addition, all of the above descriptions relate to the case where the control of a steering angle controller (SSC control system) is stopped, on the basis of having detected the timing with which a braking force controller (DSC control system) detects the oversteering state of the vehicle to start a braking force control. However, the invention is not limited to a case where control is stopped, and can be effectively applied to a case where stopped control is returned.

Additionally, in any of the above embodiments, the steering angle compensation quantity based on the SSC control at the time of the oversteering of the vehicle (i.e. the SSC control variable at the time of the oversteering of the vehicle calculated in the steering assist control calculating unit 40 for oversteering) is not reflected in the steering angle signal used when the braking and engine control ECU 30 or 70 performs the DSC control for vehicle stabilization control. Instead of this, a steering angle signal in which the steering angle compensation quantity (SSC control variable) based on the SSC control at the time of the oversteering of the vehicle calculated by the steering assist control calculating unit 40 for oversteering, and a steering angle signal in which this SSC control variable is not reflected may be properly used as the steering angle signal used when the braking and engine control ECU performs the DSC control for vehicle stabilization control.

More specifically, the braking and engine control ECG may properly use a steering angle signal set on the basis of the calculation value ([VGR+CmpC] request tire angle) of the driver target tire angle based on the VGR value according to the driver steering angle and the vehicle speed, and the CmpC value according to the steering speed, and a steering angle signal set on the basis of the calculation value ([VGR+CmpC] request tire angle) of this driver target tire angle and the calculation value ([VGR+CmpC+SSC] request tire angle) of the target tire angle in which the SSC control variable is reflected, only except for the steering angle compensation quantity based on the SSC control at the time of the oversteering of the vehicle, as the steering angle signal used for the DSC control at the time of the oversteering of the vehicle. Accordingly, in the case, not only the calculation value ([VGR+CmpC] request tire angle) of the driver target tire angle calculating unit 23, but also the calculation value ([VGR+CmpC+SSC] request tire angle) of the target tire angle calculating unit 24 are also input to the bus B1 as signals.

Figure 25:
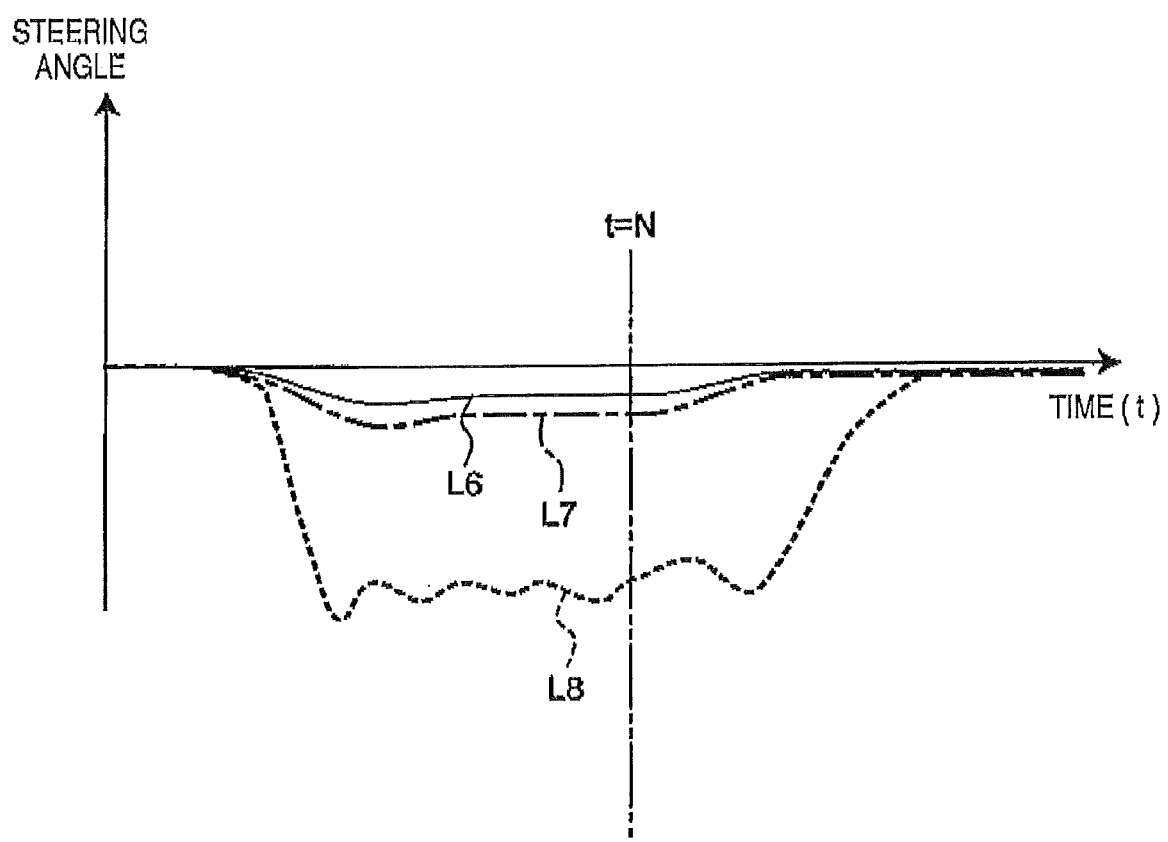
FIG. 25 is a schematic diagram showing a driver steering angle, a driver target tire angle, and a final request tire angle in a superimposed manner on a time axis.

FIG. 25 is a schematic diagram showing a driver steering angle (refer to a solid line curve L6) when there is a steering wheel manipulation by the driver, a driver target tire angle ([VGR+CmpC] request tire angle: refer to one-dot chain line curve L7) based on the calculation of the driver target tire angle calculating unit 23, and a final request tire angle ([VGR+CmpC+SSC] request tire angle: refer to broken line curve L8) based on the calculation in the target tire angle calculating unit 24 in a superimposed manner on a time axis.

In a case where the normal traveling state is turned into oversteering, when the braking and engine control ECU uses the signal of the driver target tire angle ([VGR+CmpC] request tire angle: refer to one-dot chain line curve L7) as the steering angle signal used for the DSC control, without reflecting the SSC control variable, like the aforementioned embodiments, it can be said that the control performance of vehicle stabilization by the DSC control is higher.

However, in a case where the vehicle is brought into an oversteering state due to a sudden change in road surface during the split μ braking control (during the AFSS+ABS cooperation control), if the steering angle signal used for the DSC control is still the driver target tire angle ([VGR+CmpC] request tire angle: refer to one-dot chain line curve L7, it is not possible to cope with a sudden change in vehicle behavior, and the effect of the vehicle stabilization by the DSC control cannot be sufficiently exhibited.

For example, in a case where a sudden change in road surface has occurred at a point of time t=N in FIG. 25, and the vehicle is brought into a spin (oversteering) state, the driver further turns the steering, and the DSC control is required to intervene the braking at suitable timing. At this time, however, an actual tire angle is greatly turned like the broken line curve L8 ([VGR+CmpC+SSC] request tire angle), and is greatly different from the driver target tire angle ([VGR+CmpC] request tire angle) shown by the one-dot chain line curve L7. Since the yaw rate rapidly increases in this state, the case where the control intervention quantity of the DSC control is not suitable occurs.

Thus, in the way, at the time of the split μ braking control, the braking and engine control ECU uses the steering angle signal set on the basis of the operation value ([VGR+CmpC] request tire angle) of the driver target tire angle and the calculation value ([VGR+CmpC+SSC] request tire angle) of the target tire angle in which the SSC control variable is reflected, as the steering angle signal used for the DSC control at the time of the oversteering of the vehicle, so that suitable DSC control can be performed on the basis of a steering angle signal closer to an actual tire angle. On the other hand, in the normal traveling state where the split μ braking control is not performed, the driver target tire angle ([VGR+CmpC] request tire angle: refer to one-clot chain-line curve L7) may be used as the steering angle signal used for the DSC control, without reflecting the SSC control variable.

As described above, the braking and engine control ECU is configured so as to use properly the steering angle signal in which the SSC control variable is reflected and the steering angle signal in which the SSC control variable is not reflected, as the steering angle signal used for the DSC control. Thereby, the controllability of the DSC control according to circumstances can be ensured.

Specifically, the braking and engine control ECU selectively uses, as the steering angle signal used for the DSC control at the time of the oversteering of the vehicle, the steering angle signal which is set on the basis of the calculation value ([VGR+CmpC] request tire angle) of the driver target tire angle based on the VGR value according to the driver steering angle and the vehicle speed and the CmpC value according to the steering speed and which is does not reflect the steering angle compensation quantity based on the SSC control at the time of the oversteering of the vehicle, and the steering angle signal set on the basis of the calculation value ([VGR+CmpC] request tire angle) of this driver target tire angle and the calculation value ([VGR+CmpC+SSC] request tire angle) of the target tire angle in which the SSC control variable is reflected. This can effectively suppress deterioration of the controllability of the DSC control resulting from appearance of discontinuity in a change in the tire turning angle while performing the braking control which has reflected an actual tire turning angle based on the steering wheel steering of the driver as much as possible, at the time of the oversteering of the vehicle.

Especially in a case where right and left steered wheels are traveling on road surfaces (so-called split μ road surface) which have road surface friction coefficients which are different from each other, the controllability of the DSC control at the time of the traveling on the split μ road surface can be effectively ensured by using the steering angle signal in which the SSC control variable is reflected, for the DSC control of the braking and engine control ECU.

Of course, the invention is not limited to the above embodiments, and alternations and improvements can be made without departing from the concept of the invention.

The invention relates to a motion control device which controls the motion of a vehicle at the time of turning manipulation in vehicles, such as an automobile. Particularly, the invention can be effectively utilized as a motion control device which can suitably stabilize the behavior of the vehicle at the time of occurrence of oversteering.

What is claimed is:
1. A motion control device of a vehicle comprising:
   a steering angle controller which calculates a steering angle compensation so that an actual turning control variable becomes a target turning control variable and controls a steering angle of a steering wheel by adding the target turning control variable; and a braking force controller which controls a vehicle braking force based on a steering angle signal so that the actual turning control variable becomes the target turning control variable, wherein a steering angle compensation quantity compensated by the steering angle controller at the time of oversteering of the vehicle is not reflected in the steering angle signal used for the control of the vehicle braking force by the braking force controller.

2. The motion control device according to claim 1, wherein the steering angle controller is configured so that a steering ratio is set according to a vehicle speed, the steering angle is compensated on the basis of a steering speed, and at the time of oversteering of the vehicle, the steering angle is compensated on the basis of the steering angle compensation quantity at the time of oversteering, and the braking force controller is configured so that a steering angle signal used for control at the time of the oversteering of the vehicle is set on the basis of the steering ratio and the steering speed.

3. A motion control device of a vehicle comprising:

a steering angle controller which calculates a steering angle compensation so that an actual turning control variable becomes a target turning control variable and controls a steering angle of a steering wheel by adding the target turning control variable; and a braking force controller which controls a vehicle braking force based on a steering angle signal so that the actual turning control variable becomes the target turning control variable, wherein the braking force controller selectively uses, as the steering angle signal for control, a first steering angle signal which reflects a steering angle compensation quantity compensated by the steering angle controller at the time of the oversteering of the vehicle is reflected, and a second steering angle signal which does not reflect the steering angle compensation quantity.

4. The motion control device according to claim 3, wherein the steering angle controller is configured so that a steering ratio is set according to a vehicle speed, a steering angle is compensated on the basis of a steering speed, and at the time of oversteering of the vehicle, the steering angle is compensated on the basis of the steering angle compensation quantity, the first steering angle signal is set on the basis of the steering ratio, the steering speed and the steering angle compensation quantity, and the second steering angle signal is set on the basis of the steering ratio and the steering speed and does not reflect the steering compensation quantity.

5. The motion control device according to claim 4, wherein when right and left steered wheels of the vehicle are respectively traveling on road surfaces which have road surface friction coefficients which are different from each other, the braking force controller uses the first steering angle signal for the control.

6. The motion control device according to claim 3, wherein when right and left steered wheels of the vehicle are respectively traveling on road surfaces which have road surface friction coefficients which are different from each other, the braking force controller uses the first steering angle signal for the control.

* * * * *